US011997402B2

(12) United States Patent
Hirata et al.

(10) Patent No.: US 11,997,402 B2
(45) Date of Patent: May 28, 2024

(54) VEHICULAR IMAGE CAPTURING SYSTEM AND IMAGE CAPTURING METHOD

(71) Applicants: SONY SEMICONDUCTOR SOLUTIONS CORPORATION, Kanagawa (JP); SONY GROUP CORPORATION, Tokyo (JP)

(72) Inventors: Ayaka Hirata, Tokyo (JP); Kei Nakagawa, Tokyo (JP); Kazuhiro Hoshino, Kanagawa (JP); Masatsugu Fukunaga, Kanagawa (JP)

(73) Assignees: SONY SEMICONDUCTOR SOLUTIONS CORPORATION, Kanagawa (JP); SONY GROUP CORPORATION, Tokyo (JP)

(*) Notice: Subject to any disclaimer, the term of this patent is extended or adjusted under 35 U.S.C. 154(b) by 17 days.

(21) Appl. No.: 17/439,706

(22) PCT Filed: Feb. 28, 2020

(86) PCT No.: PCT/JP2020/008279
§ 371 (c)(1),
(2) Date: Sep. 15, 2021

(87) PCT Pub. No.: WO2020/195538
PCT Pub. Date: Oct. 1, 2020

(65) Prior Publication Data
US 2022/0161728 A1 May 26, 2022

(30) Foreign Application Priority Data
Mar. 27, 2019 (JP) ................. 2019-059585

(51) Int. Cl.
B60R 1/23 (2022.01)
B60R 1/20 (2022.01)
B60R 1/22 (2022.01)
B60R 1/27 (2022.01)
H04N 23/58 (2023.01)
H04N 23/65 (2023.01)
(Continued)

(52) U.S. Cl.
CPC ............... *H04N 25/47* (2023.01); *B60R 1/20* (2022.01); *B60R 1/22* (2022.01); *B60R 1/23* (2022.01);
(Continued)

(58) Field of Classification Search
CPC .... B60R 1/20; B60R 1/22; B60R 1/23; B60R 1/27; B60R 2300/105; B60R 2300/207; B60R 2300/70; H04N 23/58; H04N 25/47
See application file for complete search history.

(56) References Cited

U.S. PATENT DOCUMENTS 10,345,447 B1* 7/2019 Hicks ................. G01S 7/4863
2017/0053407 A1 2/2017 Benosman et al.
(Continued)

FOREIGN PATENT DOCUMENTS

CN 106462976 A 2/2017
FR 3020699 A1 11/2015
(Continued)

OTHER PUBLICATIONS

International Bureau, English translation of Written Opinion for PCT/JP2020/008279 (Year: 2020).*
(Continued)

Primary Examiner — David N Werner
(74) Attorney, Agent, or Firm — CHIP LAW GROUP

(57) ABSTRACT

Provided is a vehicular image capturing system capable of further improving characteristics such as a reduction in power consumption. The system includes: an event detection unit, installed in a vehicle, that outputs an event signal in accordance with an amount of change in an intensity of received light from a predetermined light receiving range; an image capturing unit, installed in the vehicle, that performs image capturing, the image capturing being an operation of generating and accumulating a charge in accordance with an
(Continued)

intensity of received light from a predetermined image capturing range that at least partially overlaps with the predetermined light receiving range, and generating image information in accordance with an accumulation amount of the charge; and a control unit that outputs, to the image capturing unit, a control signal according to the event signal.

10 Claims, 26 Drawing Sheets

(51) Int. Cl.
*H04N 23/71* (2023.01)
*H04N 25/47* (2023.01)

(52) U.S. Cl.
CPC ............... *B60R 1/27* (2022.01); *H04N 23/58* (2023.01); *H04N 23/651* (2023.01); *H04N 23/71* (2023.01); *B60R 2300/105* (2013.01); *B60R 2300/207* (2013.01)

(56) References Cited

U.S. PATENT DOCUMENTS

| | | | |
|---|---|---|---|
| 2017/0347036 A1* | 11/2017 | Krökel | .................... G06V 20/58 |
| 2018/0098082 A1 | 4/2018 | Burns et al. | |
| 2018/0167575 A1 | 6/2018 | Watanabe et al. | |
| 2019/0061621 A1* | 2/2019 | Chae | ....................... H04N 7/181 |
| 2021/0304611 A1* | 9/2021 | Hughes | .................... B60Q 9/00 |
| 2021/0327090 A1* | 10/2021 | Naganuma | ................ G06T 7/80 |
| 2022/0166925 A1* | 5/2022 | Nakagawa | ................ B60R 1/00 |

FOREIGN PATENT DOCUMENTS

| | | | |
|---|---|---|---|
| JP | 2012-006551 A | 1/2012 | |
| JP | 2017-521746 A | 8/2017 | |
| WO | 2015/166176 A1 | 11/2015 | |
| WO | 2017/013806 A1 | 1/2017 | |
| WO | WO-2018056515 A1 * | 3/2018 | ............... B60R 1/00 |
| WO | 2018/063523 A1 | 4/2018 | |

OTHER PUBLICATIONS

N.F.Y. Chen, Pseudo-Labels for Supervised Learning on Dynamic Vision Sensor Data, Applied to Object Detection under Ego-Motion, 2018 IEEE/CVF Conf. on Computer Vision & Pattern Recognition Workshops 757-766 (Jun. 2018) (Year: 2018).*
International Search Report and Written Opinion of PCT Application No. PCT/JP2020/008279, dated May 26, 2020, 09 pages of ISRWO.

* cited by examiner

VEHICULAR IMAGE CAPTURING SYSTEM AND IMAGE CAPTURING METHOD

CROSS REFERENCE TO RELATED APPLICATIONS

This application is a U.S. National Phase of International Patent Application No. PCT/JP2020/008279 filed on Feb. 28, 2020, which claims priority benefit of Japanese Patent Application No. JP 2019-059585 filed in the Japan Patent Office on Mar. 27, 2019. Each of the above-referenced applications is hereby incorporated herein by reference in its entirety.

TECHNICAL FIELD

The present technique relates to a vehicular image capturing system and an image capturing method.

BACKGROUND ART

Thus far, a vehicular image capturing system that captures an image of the periphery of a vehicle using a plurality of RGB cameras installed in the vehicle and displays an image obtained by the capturing in a display disposed within the vehicle has been proposed (see PTL 1, for example). In the vehicular image capturing system described in PTL 1, all of the plurality of RGB cameras are operated in order to alert a driver of obstructions and the like in the periphery of the vehicle.

CITATION LIST

Patent Literature

[PTL 1]
JP 2012-006551 A

SUMMARY

Technical Problem

In such a vehicular image capturing system, there is a need for further improvements, such as reducing power consumption.

An object of the present disclosure is to provide a vehicular image capturing system and an image capturing method capable of further improving characteristics such as a reduction in power consumption.

Solution to Problem

A vehicular image capturing system according to the present disclosure includes: (a) an event detection unit, installed in a vehicle, that outputs an event signal in accordance with an amount of change in an intensity of received light from a predetermined light receiving range; (b) an image capturing unit, installed in the vehicle, that performs image capturing, the image capturing being an operation of generating and accumulating a charge in accordance with an intensity of received light from a predetermined image capturing range that at least partially overlaps with the predetermined light receiving range, and generating image information in accordance with an accumulation amount of the charge; and (c) a control unit that outputs, to the image capturing unit, a control signal according to the event signal.

An image capturing method according to the present disclosure includes (a) obtaining, from an event detection unit that is installed in a vehicle and that outputs an event signal in accordance with an amount of change in an intensity of received light from a predetermined light receiving range, the event signal; and (b) outputting a control signal according to the obtained event signal to an image capturing unit, installed in the vehicle, that generates and accumulates a charge in accordance with an intensity of received light from a predetermined image capturing range that at least partially overlaps with the predetermined light receiving range, and generates image information in accordance with an accumulation amount of the charge, and causing the image capturing unit to perform an operation according to the control signal.

DESCRIPTION OF EMBODIMENTS

The inventors discovered the following issues with the vehicular image capturing system described in PTL 1. The vehicular image capturing system described in PTL 1 is configured such that all of a plurality of RGB cameras are operated, which can result in an increase in the amount of power consumption. An increase in the amount of power consumption may place a large load on an in-vehicle battery in situations where the engine is stopped and no power is being generated, such as, for example, when the vehicle is parked, the engine is turned off during idling, and so on.

Examples of a vehicular image capturing system and an image capturing method according to embodiments of the present disclosure will be described hereinafter with reference to FIGS. 1, 2, 3, 4, 5, 6, 7, 8, 9, 10, 11, 12, 13A, 13B, 14, 15, 16, 17, 18, 19, 20, 21, 22, 23, 24, 25, 26, 27 28, 29, 30, 31, 32, 33, and 34. The embodiments of the present disclosure will be described in the following order. Note, however, that the present disclosure is not limited to the following examples. Additionally, the advantages described in the present specification are merely exemplary and not limited, and other advantages may be obtained.

1. First Embodiment: Vehicular Image Capturing System
  1-1 Overall Configuration of Vehicular Image Capturing System
  1-2 Sensor Control Processing
  1-3 Operations of Vehicular Image Capturing System
  1-4 Variations
2. Second Embodiment: Vehicular Image Capturing System
  2-1 Configurations of Primary Elements
3. Third Embodiment: Vehicular Image Capturing System
  3-1 Configurations of Primary Elements
  3-2 Variations
4. Fourth Embodiment: Vehicular Image Capturing System
  4-1 Configurations of Primary Elements
  4-2 Variations
5. Fifth Embodiment: Vehicular Image Capturing System
  5-1 Configurations of Primary Elements
6. Sixth Embodiment: Vehicular Image Capturing System
  6-1 Configurations of Primary Elements
7. Sixth Embodiment: Vehicular Image Capturing System
  7-1 Configurations of Primary Elements

1. First Embodiment

[1-1 Overall Configuration of Vehicular Image Capturing System]

Figure 1:
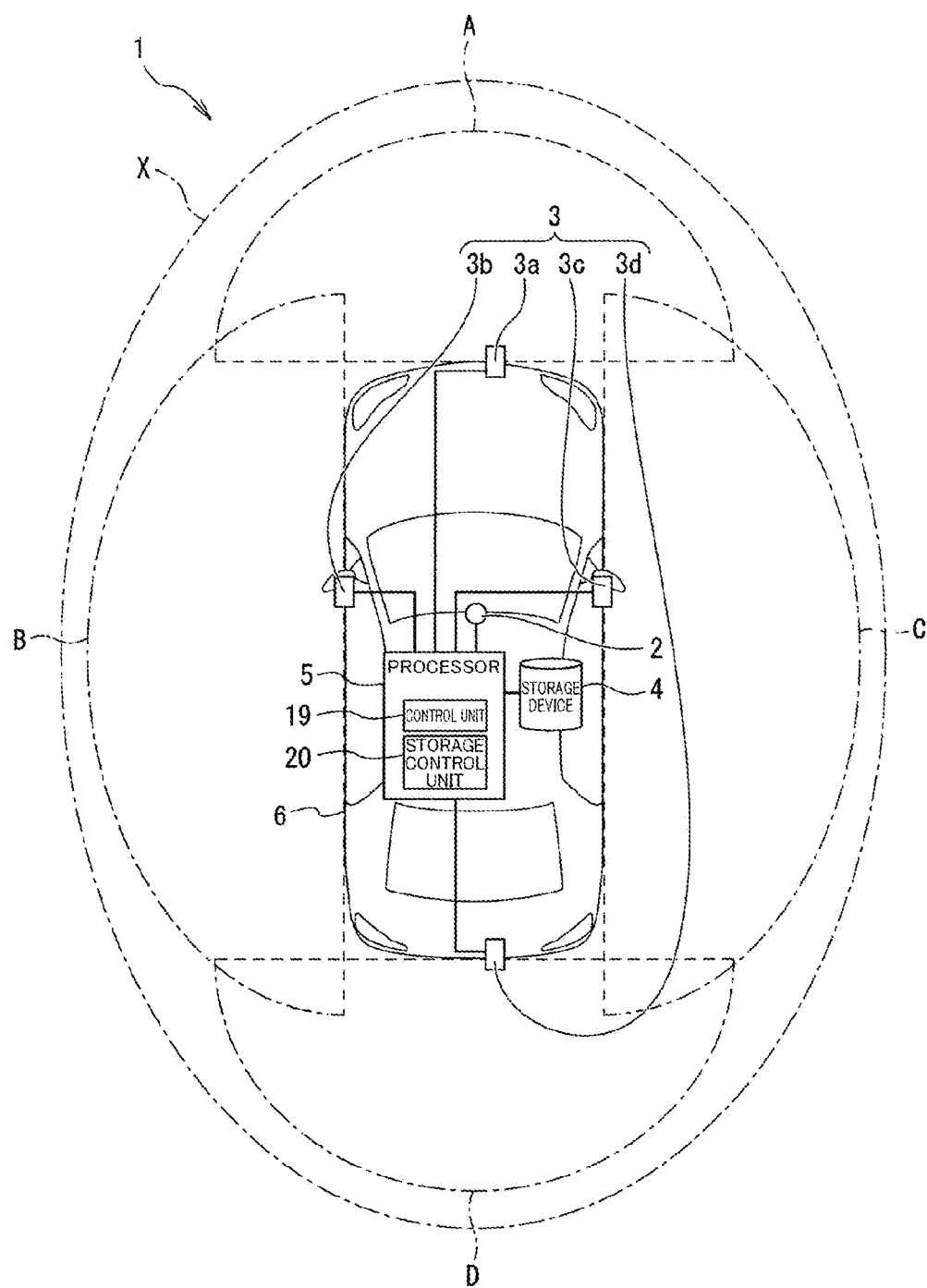
FIG. 1 is a diagram illustrating the configuration of a vehicular image capturing system according to a first embodiment of the present disclosure.

FIG. 1 is a diagram illustrating the overall configuration of a vehicular image capturing system 1 according to a first embodiment of the present disclosure. The vehicular image capturing system 1 of FIG. 1 includes an event detection unit 2, an image capturing unit 3, a storage device 4, and a processor 5.

Figure 2:
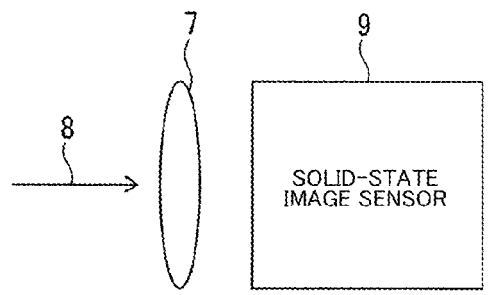
FIG. 2 is a diagram illustrating the configuration of an event detection unit.

The event detection unit 2 is constituted by a single DVS (Dynamic Vision Sensor) which is attached to the inside or the outside of a vehicle 6 and has a light receiving range X in the periphery of the vehicle 6. As illustrated in FIG. 2, the event detection unit 2 captures image light (incident light 8) from a subject into a solid-state image sensor 9 through a wide-angle optical lens 7 such as a fisheye lens, generates an event signal in units of pixels of the solid-state image sensor 9 according to the intensity of the incident light 8 formed on an image capturing surface, and outputs the generated event signal. The event detection unit 2 may be attached to the vehicle 6 with a single DVS placed on a rotating platform so that the light receiving range is 360 degrees around the vehicle 6.

Figure 3:
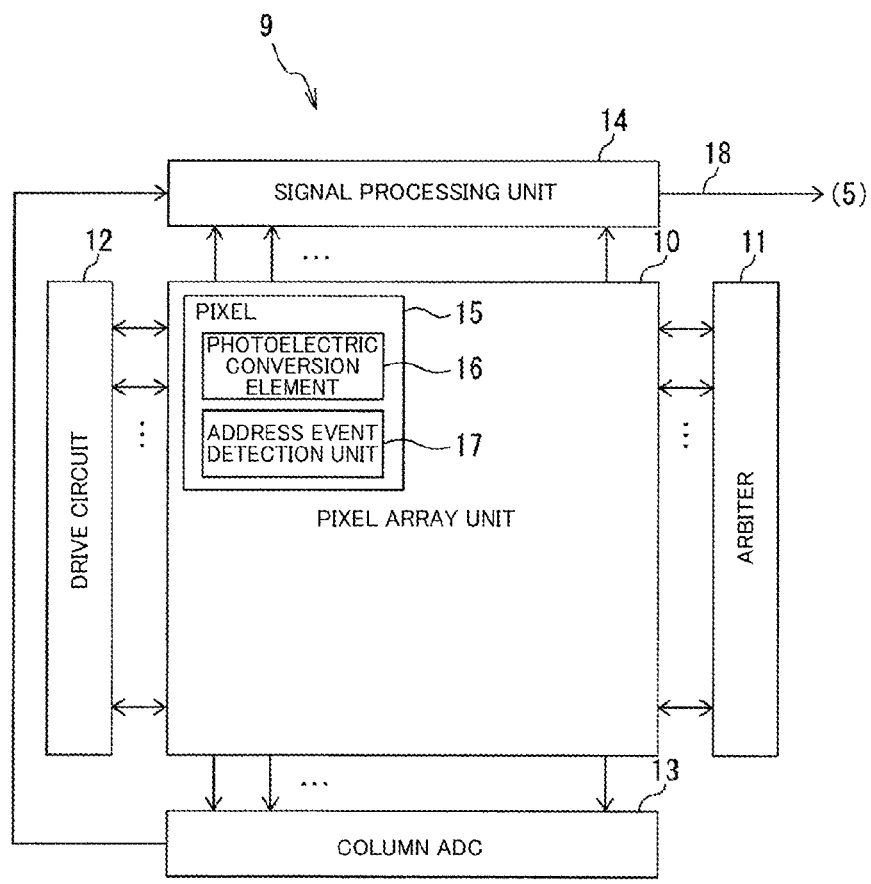
FIG. 3 is a diagram illustrating the configuration of a solid-state image sensor.

As illustrated in FIG. 3, the solid-state image sensor 9 includes a pixel array unit 10, an arbiter 11, a drive circuit 12, a column ADC 13, and a signal processing unit 14. The pixel array unit 10 includes a plurality of pixels 15 arranged regularly in a two-dimensional array on a substrate. Each of the pixels 15 has a photoelectric conversion element 16 that generates photocurrent according to the intensity of received light, and an address event detection unit 17 that detects the presence or absence of an address event on the basis of whether or not an amount of change in the generated photocurrent exceeds a predetermined threshold. An on event indicating that the amount of change in photocurrent exceeds an upper limit threshold and an off event indicating that the change in photocurrent is below a lower limit threshold can be given as examples of the address event. When an address event occurs, the address event detection unit 17 outputs a request to the arbiter 11 requesting an event signal to be sent, and upon receiving a response to the request from the arbiter 11, supplies the event signal to the drive circuit 12 and the signal processing unit 14. For example, a signal that includes the address of the pixel 15 where the address event occurred (i.e., information indicating the pixel 15 where there was a change in the intensity of the received light) and the time when the address event occurred can be employed as the event signal.

Upon receiving a request from the pixel 15 (the request to send the event signal), the arbiter 11 mediates the received request and sends a response to the pixel 15 on the basis of a result of the mediation.

The drive circuit 12 drives each pixel 15 and supplies pixel signals to the column ADC 13.

For each column of the pixels 15, the column ADC 13 converts an analog pixel signal from that column into a digital signal. The digital signal resulting from the conversion is supplied to the signal processing unit 14.

The signal processing unit 14 executes predetermined signal processing such as CDS (Correlated Double Sampling) on the digital signal from the column ADC 13. A digital signal obtained as a result of the signal processing is output to the processor 5 along with the event signal, through a signal line 18.

With this solid-state image sensor 9, the event detection unit 2 is capable of generating an event signal according to an amount of change in the intensity of light received from the light receiving range X and outputting the generated event signal.

As illustrated in FIG. 1, the image capturing unit 3 includes four image sensors 3a, 3b, 3c, and 3d. The image sensors 3a, 3b, 3c, and 3d are constituted by RGB cameras disposed in front, rear, left, and right parts of the vehicle 6. A CMOS camera, a CCD camera, or the like can be used as the RGB camera, for example. The image sensor 3a is attached to a front nose of the vehicle 6, and takes an area in front of the front nose as an image capturing range A. The image sensor 3b is attached to a left side mirror of the vehicle 6, and takes an area to the left side of the vehicle 6 as an image capturing range B. Furthermore, the image sensor 3c is attached to a right side mirror of the vehicle 6, and takes an area to the right side of the vehicle 6 as an image capturing range C. Additionally, the image sensor 3c is attached to a rear bumper of the vehicle 6, and takes an area behind the rear bumper as an image capturing range D. Each of the image capturing ranges A, B, C, and D at least partially overlaps with the light receiving range X. FIG. 1 illustrates an example in which each of the image capturing ranges A, B, C, and D is set to be within the light receiving range X.

Each of the image sensors 3a, 3b, 3c, and 3d performs image capturing, which is an operation of generating and accumulating electric charges according to the intensity of light from the image capturing ranges A, B, C, and D, and generating image information of the image capturing ranges A, B, C, and D according to the amounts of the accumulated electric charges, and then outputs the image information generated by the image capturing.

The event detection unit 2 reads out the pixel signals, event signals, and the like only from pixels 15 in which an address event has occurred, and therefore consumes only a small amount of power per unit of time. On the other hand, the image sensors 3a, 3b, 3c, and 3d read out charge accumulation amounts from all the pixels every predetermined amount of time in order to generate the image information, and therefore consume a greater amount of power than the event detection unit 2 per unit of time.

The storage device 4 is constituted by flash memory or the like. The storage device 4 stores various types of programs which can be executed by the processor 5. The storage device 4 also stores various types of data require to execute control programs, the image information output by the image sensors 3a, 3b, 3c, and 3d, and the like.

The processor 5 reads out a control program from the storage device 4 and executes the read-out control program. A control unit 19, a storage control unit 20, and the like are realized by the control programs. The control unit 19, the storage control unit 20, and the like execute sensor control processing.

[1-2 Sensor Control Processing]

Sensor control processing executed by the control unit 19 and the storage control unit 20 will be described next.

At the start of the sensor control processing, the event detection unit 2 is put into an operational state, and the image sensors 3a, 3b, 3c, and 3d are all put into a non-operational state so that almost no power is consumed.

Figure 4:
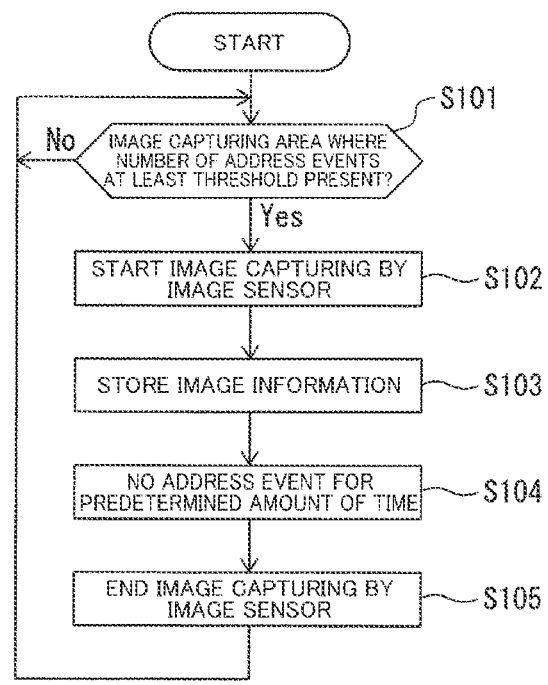
FIG. 4 is a flowchart illustrating sensor control processing.

As illustrated in FIG. 4, first, in step S101, the control unit 19 determines, for each of the image capturing ranges A, B, C, and D, whether or not a number of address events detected by the event detection unit 2 in a group of pixels 15 corresponding to the image capturing range A, B, C, or D is at least a predetermined threshold. Specifically, the event signals are obtained sequentially from the event detection unit 2, and it is determined whether or not there is a group of pixels 15, among four groups of pixels 15 corresponding to the respective image capturing ranges A, B, C, and D, that includes at least the predetermined threshold of pixels 15 in which an event signal obtained from the event detection unit 2 is indicated within a predetermined time range. If it is determined that the number of address events in any one of the image capturing ranges A, B, C, and D is at least the predetermined threshold (Yes), the sequence moves to step S102. On the other hand, if it is determined that the number of address events is less than the predetermined threshold in all of the image capturing ranges A, B, C, and D (No), the determination is made again.

In step S102, the control unit 19 detects the image capturing range A, B, C, or D corresponding to the group of pixels 15 for which the number of address events has been determined to be at least the predetermined threshold in step S101, and outputs a control signal to the image sensor 3a, 3b, 3c, or 3d corresponding to the image capturing range A, B, C, or D. A signal that causes the image sensor 3a, 3b, 3c, or 3d to start capturing an image is output as the control signal. As such, only one of the image sensors 3a, 3b, 3c, and 3d enters an operational state and starts capturing an image, while the rest remain in the non-operational state. Accordingly, although the event detection unit 2 is also operating, the overall power consumption is kept lower than in a method in which all of the image sensors 3a, 3b, 3c, and 3d are in an operational state. As a result of steps S101 and S102, control signals are output to the image sensor 3a, 3b, 3c, or 3d that includes the area in the periphery of the vehicle 6, corresponding to the group of pixels 15 indicated by the many event signals, in the image capturing range A, B, C, or D.

The sequence then moves to step S103, where the storage control unit 20 causes the image information output by the image sensor 3a, 3b, 3c, or 3d which was made to start capturing an image in step S102 to be stored in the storage device 4. As a result, when, for example, a person has approached the vehicle 6 when the vehicle 6 is parked and the user is away from the vehicle 6, image information showing the approaching person is stored.

The sequence then moves to step S104, where the control unit 19 places the group of pixels 15 for which the number of address events has been determined to be at least the predetermined threshold in step S101 into a standby state until a state in which no address events occur continues for at least a predetermined amount of time. When the state in which no address events occur continues for at least the predetermined amount of time, the sequence moves to step S105.

In step S105, the control unit 19 outputs a control signal to the image sensor 3a, 3b, 3c, or 3d that output a control signal in step S102, after which the sequence returns to step S101. A signal that causes the image sensor 3a, 3b, 3c, or 3d to stop capturing an image is output as the control signal.

[1-3 Operations of Vehicular Image Capturing System]

Operations of the vehicular image capturing system 1 (an image capturing method) according to the first embodiment of the present disclosure will be described next.

Figure 5:
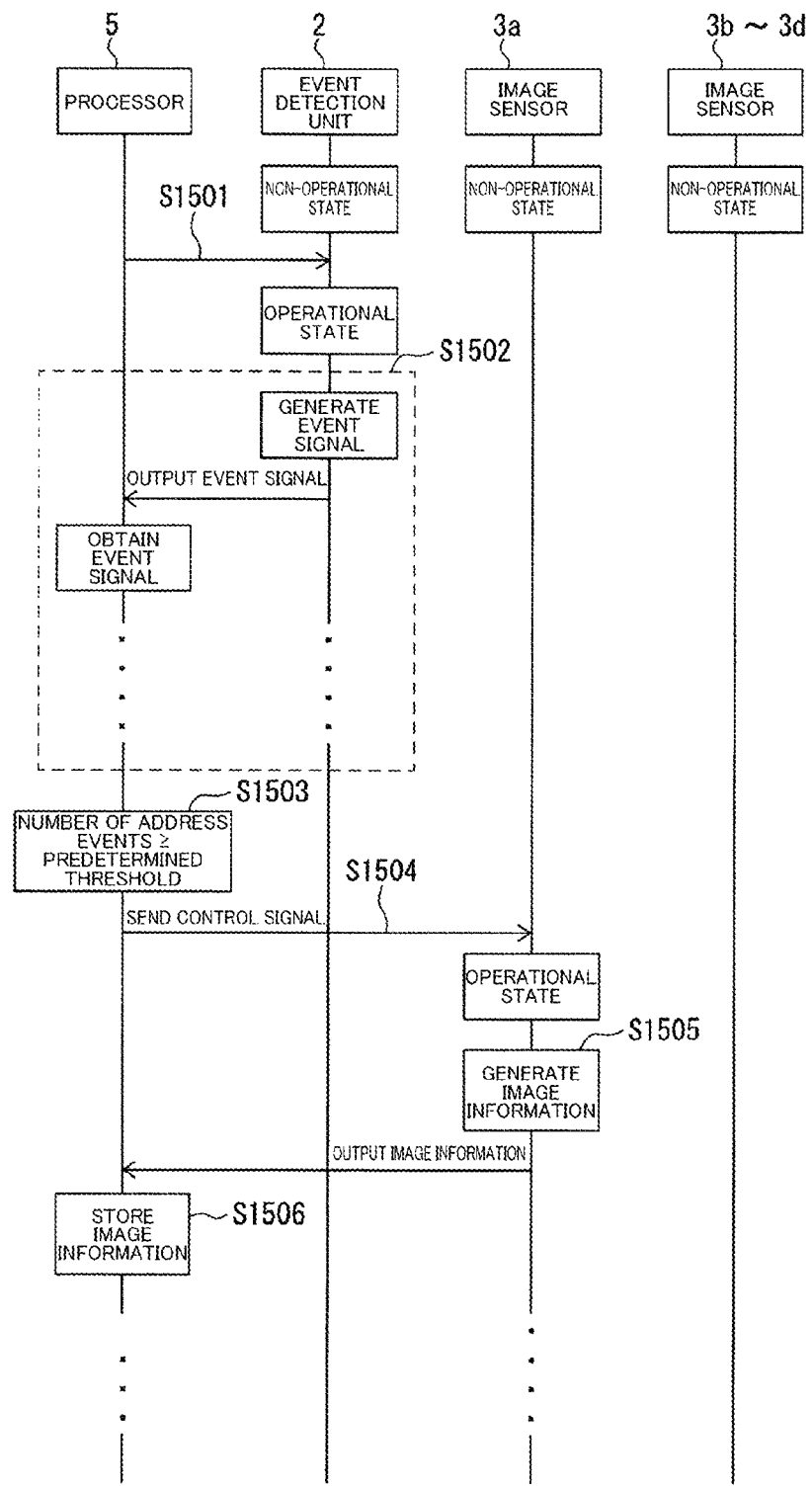
FIG. 5 is a sequence chart illustrating operations of the vehicular image capturing system.

FIG. 5 is a sequence chart illustrating operations of the vehicular image capturing system.

First, assume that the user has parked the vehicle 6, caused the processor 5 to start the sensor control processing, and moved away from the vehicle 6. Upon doing so, the processor 5 puts the event detection unit 2 into an operational state (step 1501). Next, the event detection unit 2 repeatedly executes operations of generating an event signal in accordance with the amount of change in the intensity of light received from the periphery of the vehicle 6 (the light receiving range X indicated in FIG. 1) and outputting the generated event signal to the processor 5 (step S1502). As a result, the processor 5 sequentially obtains the event signals output from the event detection unit 2. At this point in time, all of the image sensors 3a, 3b, 3c, and 3d are in a non-operational state.

Here, assume that a person approaching the vehicle 6 from the front has appeared, and the processor 5 determines that the number of address events that have occurred, in the event detection unit 2, in the group of pixels 15 corresponding to the area in front of the vehicle 6 (the image capturing range A indicated in FIG. 1) is at least the predetermined threshold (step S1503). Then, the processor 5 sends a control signal for starting the capturing of an image to the image sensor 3a, and puts the image sensor 3a into an operational state (step S1504). In other words, a control signal according to the event signal output by the event detection unit 2 is output to the image sensor 3a, causing the image sensor 3a to perform operations according to the control signal. Next, the image sensor 3a starts capturing an image, generating and accumulating charges in accordance with the intensity of the light received from the image capturing range A, and generates image information according to the charge accumulation amount (step S1505). The remaining image sensors 3b, 3c, and 3d remain in the non-operational state. Next, the processor 5 causes the image information generated by the image sensor 3a to be stored in the storage device 4 (step S1506). Then, by repeating the flow of steps S1505 and S1506, image information showing the person approaching the vehicle 6 is stored while suppressing power consumption.

As described thus far, according to the vehicular image capturing system 1 of the first embodiment, the event detection unit 2 detects an event signal, and a control signal according to the detected event signal is output to the image capturing unit 3. As such, the image capturing unit 3 can be kept in a non-operational state, i.e., a state where no power is consumed, until the control signal is output. Accordingly, a vehicular image capturing system 1 capable of further improving characteristics such as a reduction in power consumption can be provided. Therefore, by reducing the amount of power consumption, the load placed on an in-vehicle battery in situations where the engine is stopped and no power is being generated, such as, for example, when the vehicle is parked, the engine is turned off during idling, and so on, can be reduced.

Additionally, according to the vehicular image capturing system 1 of the first embodiment, the event detection unit 2 outputs an event signal indicating the pixels 15 for which the light intensity has changed, and the image capturing unit 3 includes the plurality of image sensors 3a, 3b, 3c, and 3d, which have mutually-different image capturing ranges A, B, C, and D and which output image information of areas in the periphery of the vehicle 6 corresponding to the image capturing ranges A, B, C, and D. Additionally, the control unit 19 outputs a control signal to the image sensor 3a, 3b, 3c, or 3d that includes the area corresponding to the pixels 15 indicated by the event signal in the image capturing ranges A, B, C, and D. As such, only some of the image sensors 3a, 3b, 3c, and 3d enter an operational state. The amount of power consumption can therefore be reduced reliably, compared to a method in which all of the image sensors 3a, 3b, 3c, and 3d are put into an operational state, for example.

Additionally, according to the vehicular image capturing system 1 of the first embodiment, the control unit 19 determines whether there is a group of pixels 15, among the pixels 15 in the event detection unit 2 corresponding to the respective image capturing ranges A, B, C, and D of the plurality of image sensors 3a, 3b, 3c, and 3d, including at least a predetermined threshold of pixels 15 indicated by an event signal from the event detection unit 2. Then, a control signal is output to the image sensor 3a, 3b, 3c, or 3d corresponding to the group of pixels 15 determined to be present. As such, the image sensors 3a, 3b, 3c, and 3d can be operated as appropriate by changing the threshold according to the travel environment of the vehicle 6, such as the road conditions, weather, or the like, for example.

[1-4 Variations]

Figure 6:
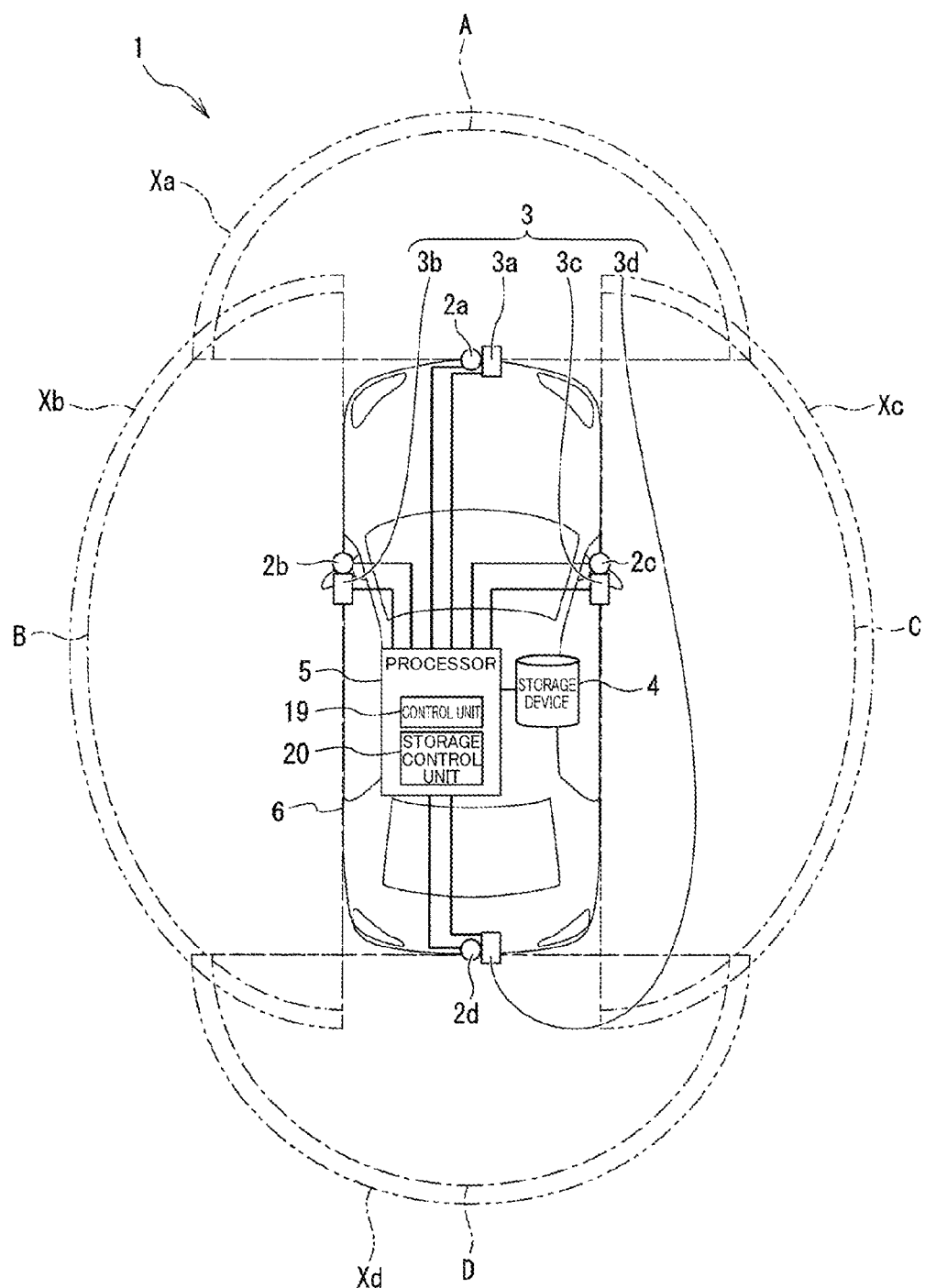
FIG. 6 is a diagram illustrating the configuration of a vehicular image capturing system according to a variation.

(1) In the vehicular image capturing system 1 according to the first embodiment, a DVS capable of capturing images of the periphery of the vehicle 6 with a single unit is described as an example of the event detection unit 2, but another configuration may be used instead. For example, a configuration may be employed in which a plurality of DVSs are disposed on the front, rear, left, and right of the vehicle 6 so that the combination of DVSs captures an image 360 degrees around the vehicle 6. For example, a configuration can be employed in which, as illustrated in FIG. 6, a plurality of event sensors 2a, 2b, 2c, and 2d are included as the event detection unit 2, the sensors respectively having mutually-different light receiving ranges Xa, Xb, Xc, and Xd and outputting event signals indicating pixels 15, among the pixels 15 corresponding to the light receiving ranges Xa, Xb, Xc, and Xd, in which the light intensity has changed. In FIG. 6, the event sensor 2a is attached to the front nose of the vehicle 6, and has the light receiving range Xa, which is broader than the image capturing range A. The event sensor 2b is attached to the left side mirror of the vehicle 6, and has the light receiving range Xb, which is broader than the image capturing range B. The event sensor 2c is attached to the right side mirror of the vehicle 6, and has the light receiving range Xc, which is broader than the image capturing range C. The event sensor 2c is attached to the rear bumper of the vehicle 6, and has the light receiving range Xd, which is broader than the image capturing range D.

(2) Although an example is described in which four RGB cameras are used as the image sensors 3a, 3b, 3c, and 3d so that the combination of RGB cameras can capture images 360 degrees around the vehicle 6, another configuration can be employed instead. For example, a single RGB camera having a fisheye lens or the like capable of capturing an image of the periphery of the vehicle 6 may be used, or a single rotating RGB camera may be used so that images can be captured 360 degrees around the vehicle 6.

(3) Additionally, although an example in which a control signal is output to one of the image sensors 3a, 3b, 3c, and 3d, another configuration may be employed instead. For example, the configuration may be such that control signals are output to all of the image sensors 3a, 3b, 3c, and 3d. For example, the image sensors 3a, 3b, 3c, and 3d may be caused to capture images continually, and control signals which increase the framerate may be output to the image sensors 3*a*, 3*b*, 3*c*, and 3*d* corresponding to the group of pixels 15 for which it is determined in step S101 that the number of address events is at least the predetermined threshold. Control signals which reduce the framerate may be output to the other image sensors 3*a*, 3*b*, 3*c*, and 3*d*. Outputting the control signals in this manner makes it possible to reduce the amount of power consumption compared to a method which increases the framerate of all of the image sensors 3*a*, 3*b*, 3*c*, and 3*d*, for example.

Figure 7:
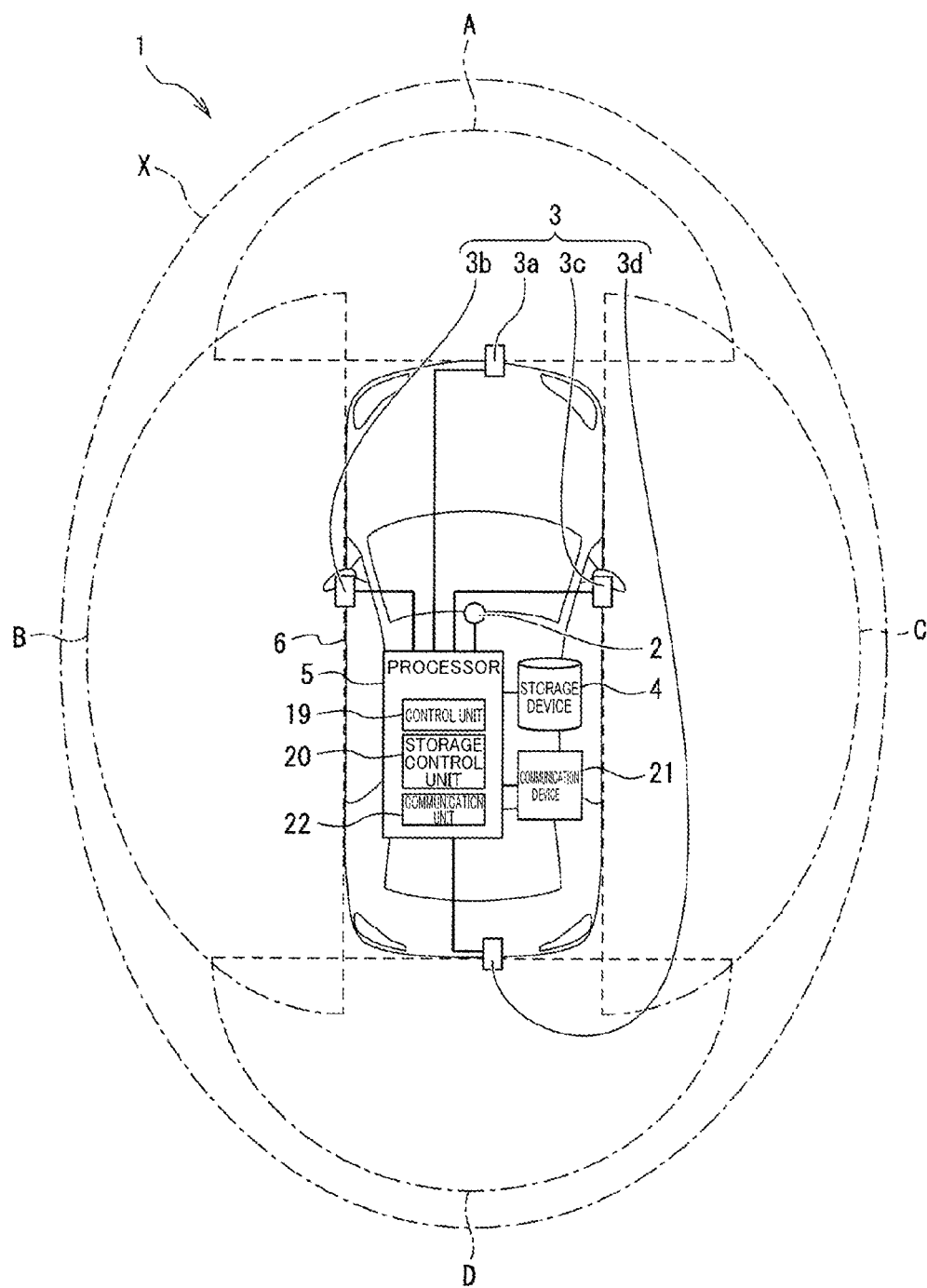
FIG. 7 is a diagram illustrating the configuration of a vehicular image capturing system according to a variation.

(4) In the vehicular image capturing system 1 according to the first embodiment, an example is described in which only the storage of the image information is performed when the image sensor 3*a*, 3*b*, 3*c*, or 3*d* starts capturing an image, but another configuration can be employed. For example, the configuration may be such that image processing is started and a notification is made to an external device. Specifically, the vehicular image capturing system 1 may further include a communication device 21 capable of communicating with an external device over the Internet, as illustrated in FIG. 7. Additionally, through a program, the processor 5 further implements a communication unit 22 capable of communicating with an external device via the communication device 21. A smartphone carried by the user of the vehicle 6 can be given as an example of the external device. Additionally, as illustrated in FIG. 8, step S201 is provided between steps S102 and S103 in FIG. 4, and step S202 is provided between steps S103 and S104 in FIG. 4.

In step S201, the control unit 19 starts image processing on the image information output by the image sensor 3*a*, 3*b*, 3*c*, or 3*d*. As a result, in step S103, the post-image processing image information is stored in the storage device 4. Additionally, in step S202, the communication unit 22 sends an alert to the external device (the smartphone or the like) via the communication device 21.

As such, in the vehicular image capturing system 1 according to this variation, when, for example, a person approaches the vehicle 6 while the vehicle 6 is parked and the user is away from the vehicle 6, the alert can be sent to the smartphone of the user. As such, the user can be alerted to the possibility of vehicle crime and the like.

Figure 8:
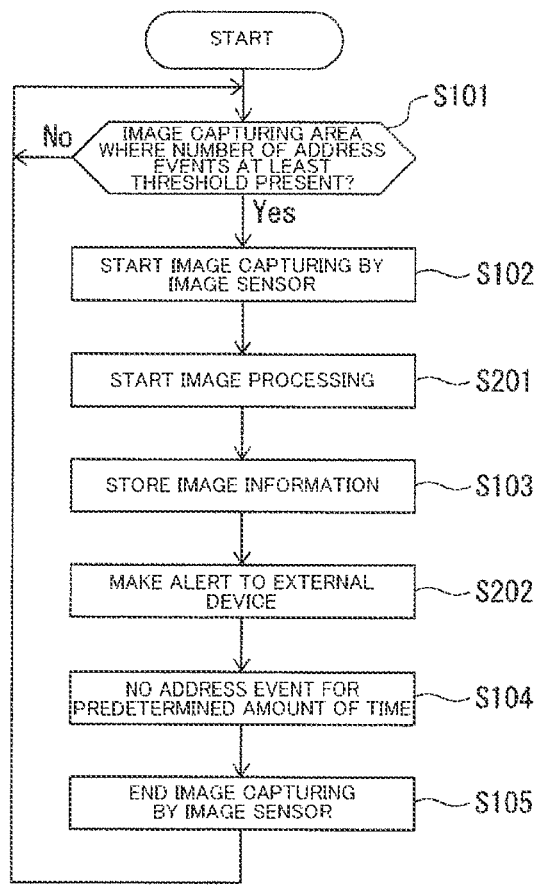
FIG. 8 is a flowchart illustrating sensor control processing according to a variation.
Figure 9:
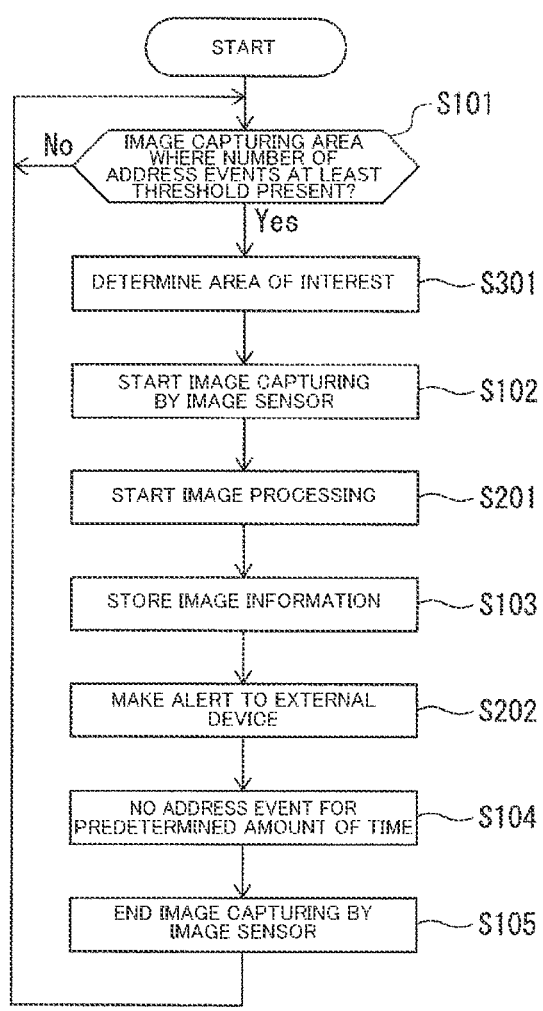
FIG. 9 is a flowchart illustrating sensor control processing according to a variation.

(5), Additionally, as illustrated in FIG. 9, for example, step S301 may be provided between steps S101 and S102, in addition to steps S201 and S202 illustrated in FIG. 8.

In step S301, the control unit 19 determines an area of interest on the basis of the event signal output from the event detection unit 2. For example, an area in the periphery of the vehicle 6 corresponding to the pixels 15 indicated by the event signal may be taken as the area of interest. Then, the control unit 19 sets image capturing conditions such that the determined area of interest can be captured clearly. For example, the zoom amount, resolution, sensitivity, and framerate can be employed as the image capturing conditions. As a result, in step S102, in addition to the signal to start capturing an image, at least one of a signal for changing the zoom amount of the electronic zoom, a signal for changing the resolution, a signal for changing the sensitivity, and a signal for changing the framerate, so that the image capturing conditions are satisfied, is included in the control signal and output to the image sensor 3*a*, 3*b*, 3*c*, or 3*d*.

Accordingly, in the vehicular image capturing system 1 according to this variation, when, for example, a person approaches the vehicle 6 while the vehicle 6 is parked and the user is away from the vehicle 6, the image information of the approaching person can be stored more clearly, which makes it possible to more appropriately prevent vehicle crime.

Figure 10:
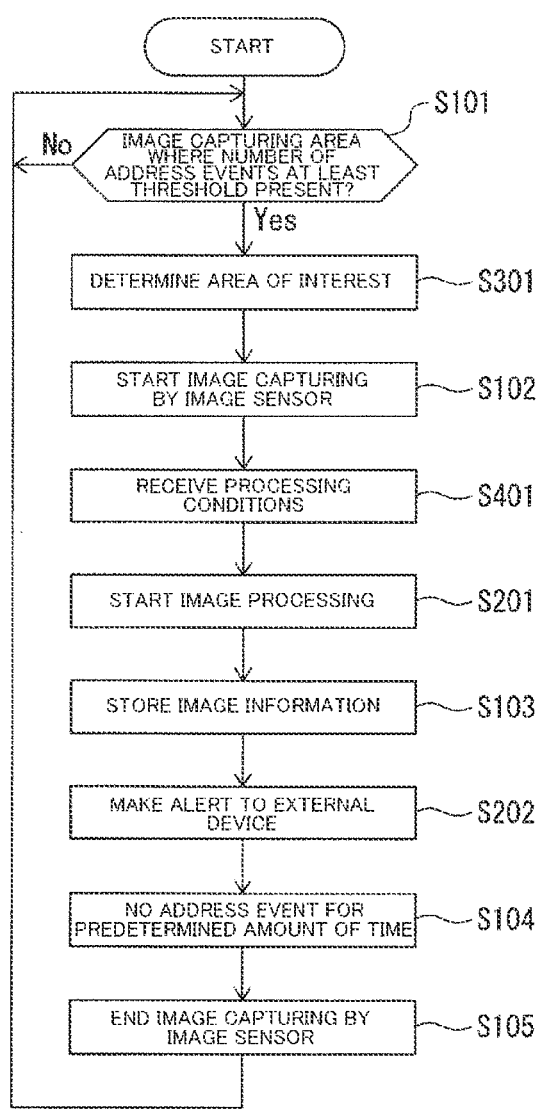
FIG. 10 is a flowchart illustrating sensor control processing according to a variation.

(6) Additionally, as illustrated in FIG. 10, for example, step S401 may be provided between steps S102 and S202 in FIG. 9. In step S401, the communication unit 22 receives processing conditions of the image processing from an external device, such as a smartphone carried by the user, via the communication device 21. The conditions of the image processing performed in step S202 change as a result. Accordingly, in the vehicular image capturing system 1 according to this variation, the processing conditions of the image processing can be changed by a user or the like, and the image information can be stored more clearly using the changed processing conditions.

2. Second Embodiment: Vehicular Image Capturing System

[2-1 Configurations of Primary Elements]

Figure 11:
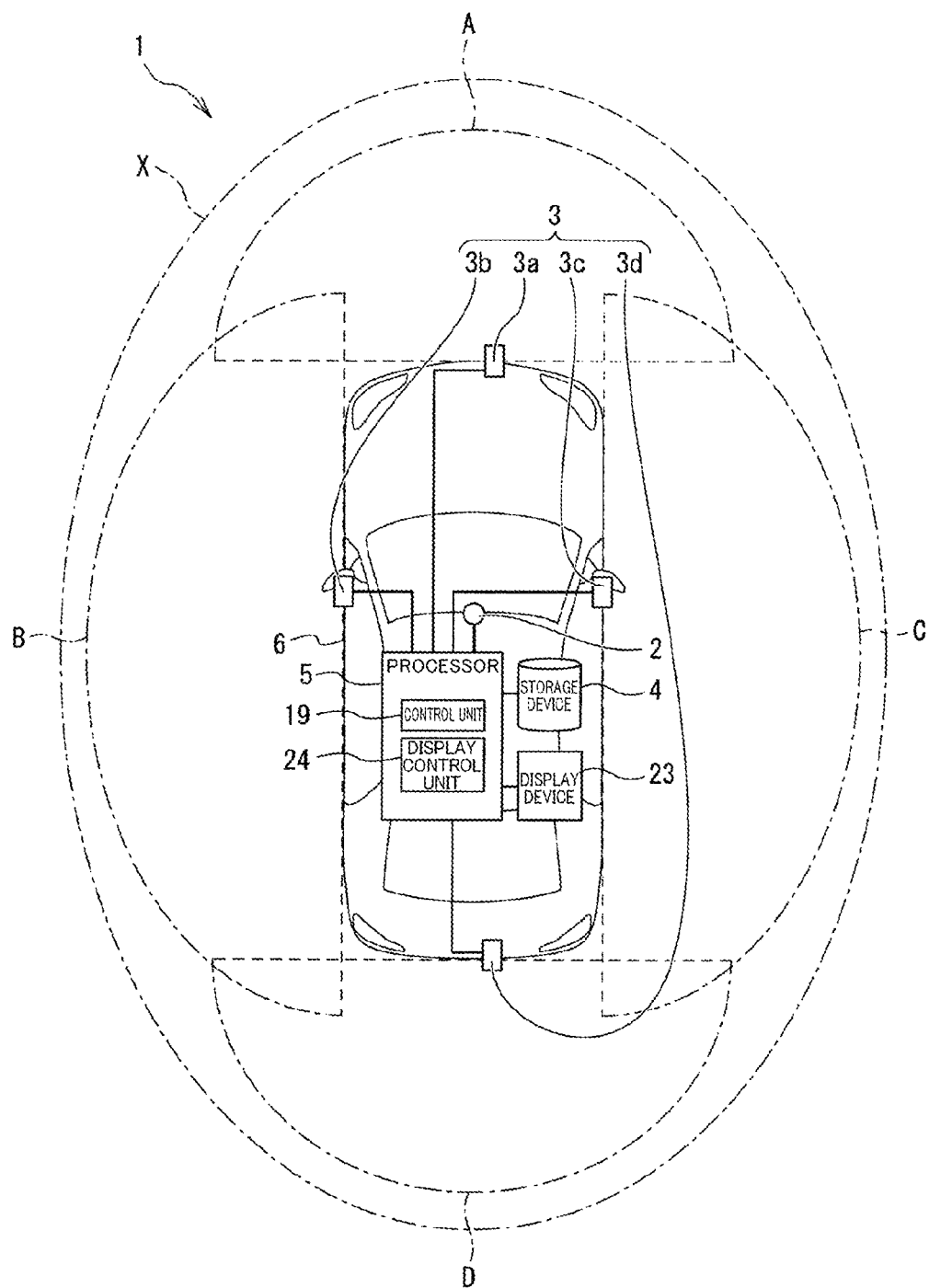
FIG. 11 is a diagram illustrating the configuration of a vehicular image capturing system according to a second embodiment.
Figure 12:
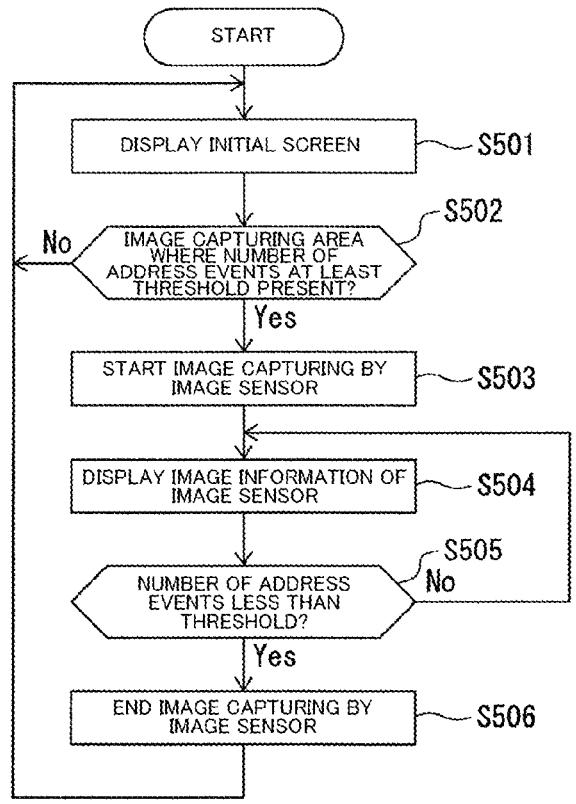
FIG. 12 is a flowchart illustrating sensor control processing.

Operations of the vehicular image capturing system 1 according to a second embodiment of the present disclosure will be described next. FIG. 11 illustrates the overall configuration of the vehicular image capturing system 1 according to the second embodiment. FIG. 12 is a flowchart illustrating sensor control processing by the vehicular image capturing system 1 according to the second embodiment. In FIG. 11, parts corresponding to those in FIG. 1 are given the same reference signs, and redundant descriptions thereof will not be given.

As illustrated in FIG. 11, the vehicular image capturing system 1 of the second embodiment further includes a display unit 23, which is disposed inside or outside the vehicle 6 and which can display various types of information, in addition to the event detection unit 2, the image capturing unit 3, the storage device 4, and the processor 5. The display unit 23 is constituted by, for example, a car navigation system display, a smartphone display, a tablet display, an electronic rearview mirror display, an electronic rearview mirror display, a windshield, or the like. FIG. 11 illustrates an example of in which the display unit 23 is disposed inside the vehicle. The processor 5 also implements the control unit 19 and a display control unit 24 through programs.

Figure 13A:
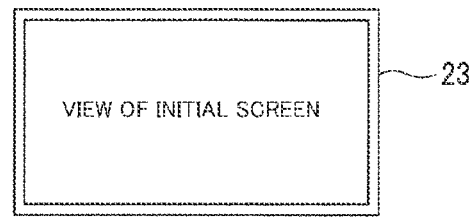
FIG. 13A is a diagram illustrating display content displayed in a display unit.

In the sensor control processing, first, in step S501, as illustrated in FIG. 12, the display control unit 24 causes the display unit 23 to display a predetermined initial screen, as illustrated in FIG. 13A. If, for example, a car navigation display is used as the display unit 23, a map of the area around the current position of the vehicle 6 is employed as the initial screen.

The sequence then moves to step S502, where the control unit 19 determines, for each of the image capturing ranges A, B, C, and D, whether or not a number of address events detected by the event detection unit 2 in a group of pixels 15 corresponding to the image capturing range A, B, C, or D is at least a predetermined threshold. Specifically, the event signals are obtained sequentially from the event detection unit 2, and it is determined whether or not there is a group of pixels 15, among four groups of pixels 15 corresponding to the respective image capturing ranges A, B, C, and D, that includes at least the predetermined threshold of pixels 15 in which an event signal obtained from the event detection unit 2 is indicated within a predetermined time range. If it is determined that the number of address events in any one of the image capturing ranges A, B, C, and D is at least the predetermined threshold (Yes), the sequence moves to step S503. On the other hand, if it is determined that the number of address events is less than the predetermined threshold in all of the image capturing ranges A, B, C, and D (No), the determination is made again.

In step S503, the control unit 19 detects the image capturing range A, B, C, or D corresponding to the group of pixels 15 for which the number of address events has been determined to be at least the predetermined threshold in step S502, and outputs a control signal to the image sensor 3a, 3b, 3c, or 3d corresponding to the image capturing range A, B, C, or D. A signal that causes the image sensor 3a, 3b, 3c, or 3d to start capturing an image is output as the control signal. Accordingly, only one of the image sensor 3a, 3b, 3c, or 3d enters an operational state and starts capturing an image, while the rest remain in the non-operational state. As such, although the event detection unit 2 is also operating, the overall power consumption is kept lower than in a method in which all of the image sensors 3a, 3b, 3c, and 3d are in an operational state. As a result of steps S502 and S503, control signals are output to the image sensor 3a, 3b, 3c, or 3d that includes the area in the periphery of the vehicle 6, corresponding to the group of pixels 15 indicated by the many event signals, in the image capturing range A, B, C, or D.

Figure 13B:
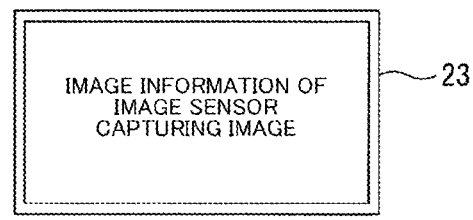
FIG. 13B is a diagram illustrating display content displayed in a display unit.

The sequence then moves to step S504, where, as illustrated in FIG. 13B, the display control unit 24 causes the image information output by the image sensor 3a, 3b, 3c, or 3d which was made to start capturing an image in step S503 to be displayed in the display unit 23. Through this, the information displayed in the display unit 23 is switched, in response to the event signal, from the image of the initial screen to the image information of the image sensor 3a, 3b, 3c, or 3d that has started capturing an image, and image information showing an approaching person or the like is presented to the user.

The sequence then moves to step S505, where the control unit 19 determines whether the number of address events has dropped below the predetermined threshold in the group of pixels 15 in which the number of address events has been determined to be at least the predetermined threshold in step S502 (called a "specific pixel group" hereinafter). Specifically, it is determined whether or not the number of pixels 15 indicated by the event signal from the event detection unit 2 has dropped below the predetermined threshold in the specific pixel group. If it is determined that the number of address events has dropped below the predetermined threshold (Yes), the sequence moves to step S506. On the other hand, if it is determined that the number of address events is at least the predetermined threshold (No), the sequence returns to step S504.

In step S506, the control unit 19 outputs a control signal to the image sensor 3a, 3b, 3c, or 3d that output a control signal in step S503, after which the sequence returns to step S501. A signal that causes the image sensor 3a, 3b, 3c, or 3d to stop capturing an image is output as the control signal. Through this, an operation is realized in which the control unit 19 outputs a signal for starting image capturing as a control signal, and when the number of pixels 15 indicated by the event signal has dropped below the predetermined threshold in the group of pixels 15 determined to include at least the predetermined threshold of pixels indicated by the event signal, outputs, as the control signal, a signal causing the image capturing to stop, to the image sensors 3a, 3b, 3c, and 3d corresponding to the stated group of pixels 15.

As described thus far, according to the vehicular image capturing system 1 of the second embodiment, the display control unit 24, which causes the display unit 23 to display the image information output by the image sensor 3a, 3b, 3c, or 3d that includes the area in the periphery of the vehicle 6 corresponding to the pixels 15 indicated by the event signal in the image capturing ranges A, B, C, and D, is provided, and thus the image information of an area in which a person has approached or the like can be presented to the user.

Additionally, according to the vehicular image capturing system 1 of the second embodiment, the display control unit 24 switches the information displayed by the display unit 23 in accordance with the event signal. As such, for example, more appropriate information can be displayed in the display unit 23, and the various types of information can be presented to the user more appropriately.

3. Third Embodiment: Vehicular Image Capturing System

[3-1 Configurations of Primary Elements]

Figure 14:
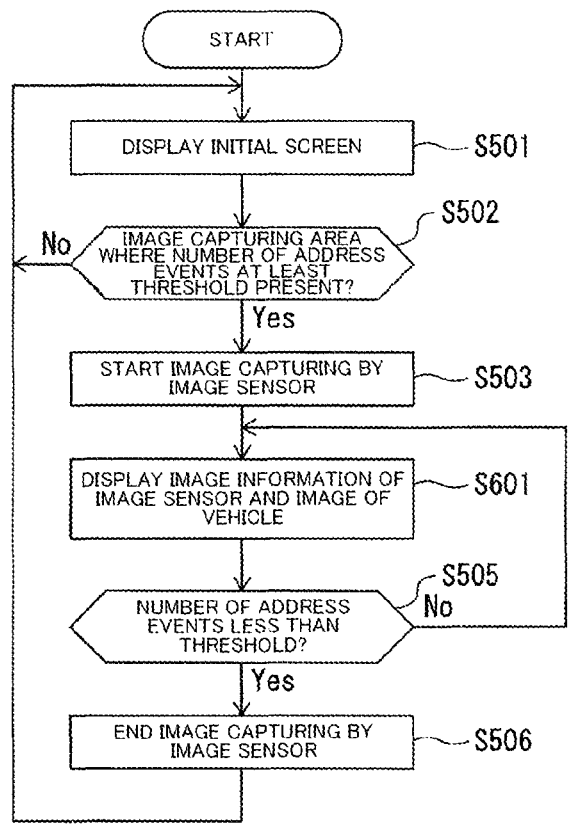
FIG. 14 is a flowchart illustrating sensor control processing according to a third embodiment.

Operations of the vehicular image capturing system 1 according to a third embodiment of the present disclosure will be described next. The overall configuration of the vehicular image capturing system 1 of the third embodiment is the same as the overall configuration of the vehicular image capturing system 1 of the second embodiment, illustrated in FIG. 11. FIG. 14 is a flowchart illustrating sensor control processing by the vehicular image capturing system 1 according to the third embodiment. Parts corresponding to the flowchart illustrated in FIG. 12 are included in this flowchart. In FIG. 14, parts corresponding to those in FIG. 12 are given the same reference signs, and redundant descriptions thereof will not be given.

As illustrated in FIG. 14, the sensor control processing of the vehicular image capturing system 1 of the third embodiment is provided with step S601 instead of step S504 in FIG. 12.

Figure 15:
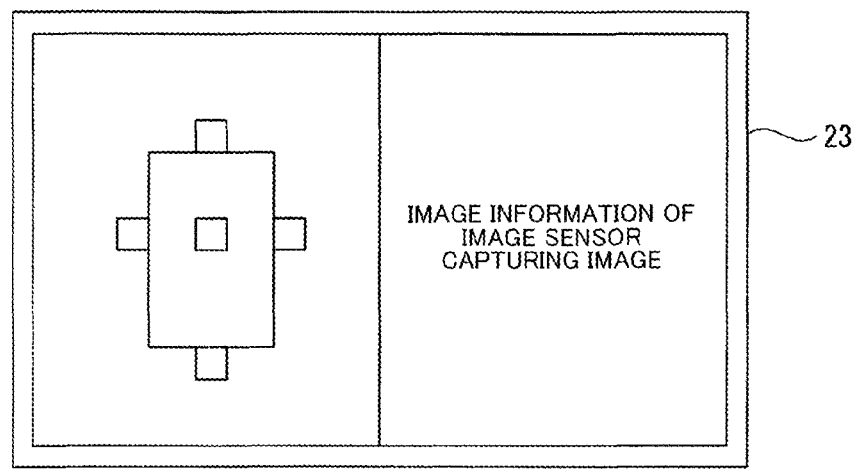
FIG. 15 is a diagram illustrating display content displayed in a display unit.

In step S601, as illustrated in FIG. 15, the display control unit 24 causes both the image information output by the image sensor 3a, 3b, 3c, or 3d which was made to start capturing an image in step S503, and an image of the vehicle 6 from directly above, to be displayed in the display unit 23. FIG. 15 illustrates an example in which the image information of the image sensor 3a, 3b, 3c, or 3d is displayed in the right side of the display screen of the display unit 23, and the image of the vehicle 6 from directly above is displayed in the left side of the display screen. In the image of the vehicle 6 in FIG. 15, the large rectangle in the center represents the vehicle 6, the smaller squares arranged in the periphery of the vehicle 6 represent the image sensors 3a, 3b, 3c, and 3d, and the small circle in the center of the vehicle 6 represents the event detection unit 2. The upper side of the image of vehicle 6 in FIG. 15 corresponds to the front nose side of the vehicle 6, and the lower side of the image of vehicle 6 in FIG. 15 corresponds to the rear bumper side of the vehicle 6. As described thus far, according to the vehicular image capturing system 1 of the third embodiment, both the image information output by the image sensor 3a, 3b, 3c, or 3d and an image of the vehicle 6 including the image sensors 3a, 3b, 3c, and 3d are displayed in the display unit 23. As such, it is easy for the user to know from which direction the image information displayed on the display unit 23 has been obtained.

[3-2 Variations]

(1) An example in which the image information output by the image sensor 3a, 3b, 3c, or 3d and the image of the vehicle 6 is displayed in the display unit 23 has been described as the vehicular image capturing system 1 according to a variation on the third embodiment, but other configurations can be employed instead. For example, a configuration may be employed in which information indicating the position of the image sensor 3a, 3b, 3c, or 3d which is capturing an image is also displayed. Specifically, as illustrated in FIG. 16, step S701 may be provided instead of step S601 of FIG. 14.

Figure 16:
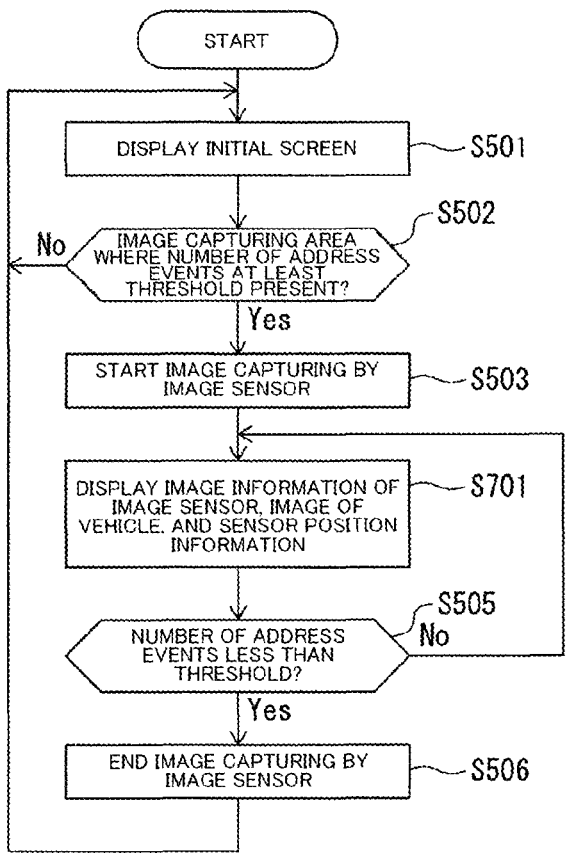
FIG. 16 is a flowchart illustrating sensor control processing according to a variation.
Figure 17:
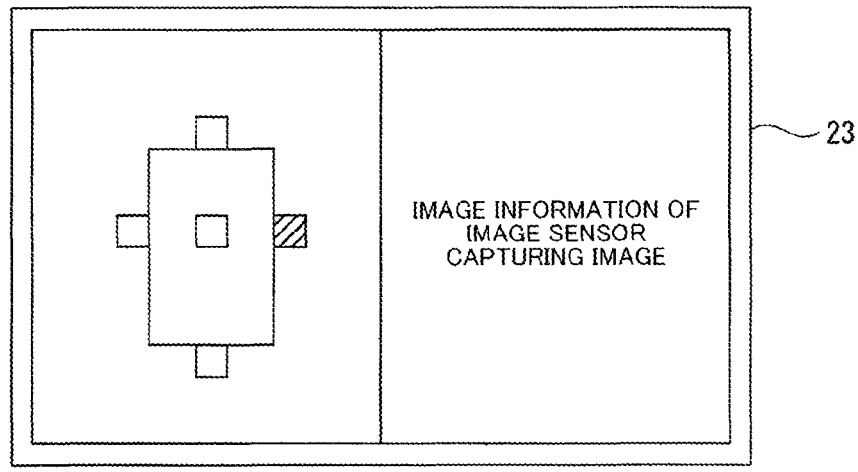
FIG. 17 is a diagram illustrating display content displayed in a display unit according to a variation.

In step S701, as illustrated in FIG. 16, the display control unit 24 causes the image information output by the image sensor 3a, 3b, 3c, or 3d which was made to start capturing an image in step S503, an image of the vehicle 6 from directly above, and information indicating the position of the image of the image sensor 3a, 3b, 3c, or 3d that is capturing an image (also called "sensor position information" hereinafter) to be displayed in the display unit 23. For example, a method in which the image of the image sensors 3a, 3b, 3c, or 3d which is capturing an image, among the images of the image sensors 3a, 3b, 3c, and 3d included in the image of the vehicle 6, is displayed in a predetermined color can be employed as a method for presenting the sensor position information. FIG. 17 illustrates an example in which the image sensor 3c is capturing an image, and thus the image of the image sensor 3c included in the image of the vehicle 6 is displayed in a predetermined color.

Accordingly, in the vehicular image capturing system 1 according to this variation, it is easier for the user to know from which direction the image information displayed on the display unit 23 has been obtained.

Figure 18:
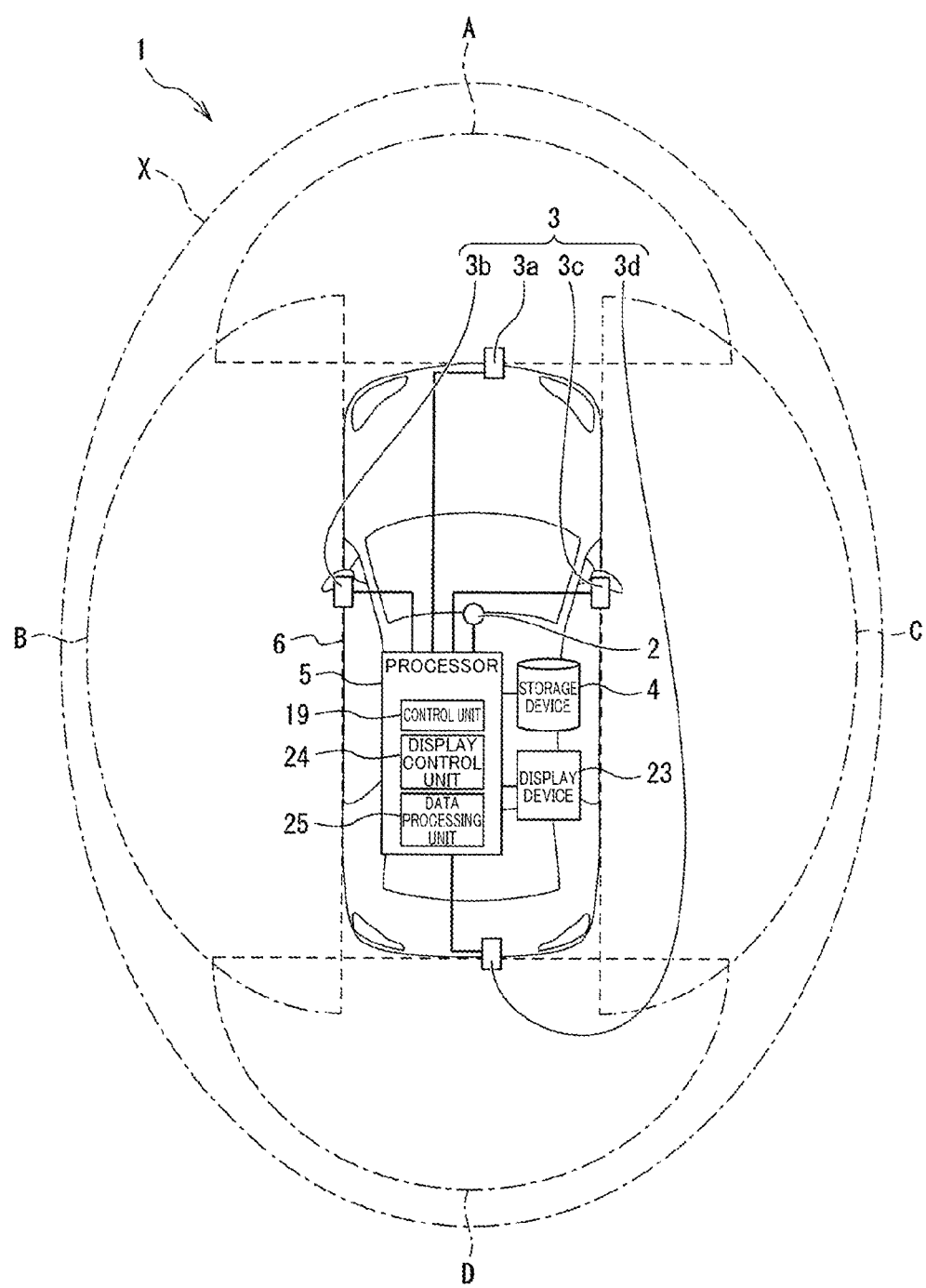
FIG. 18 is a diagram illustrating the configuration of a vehicular image capturing system according to a variation.
Figure 19:
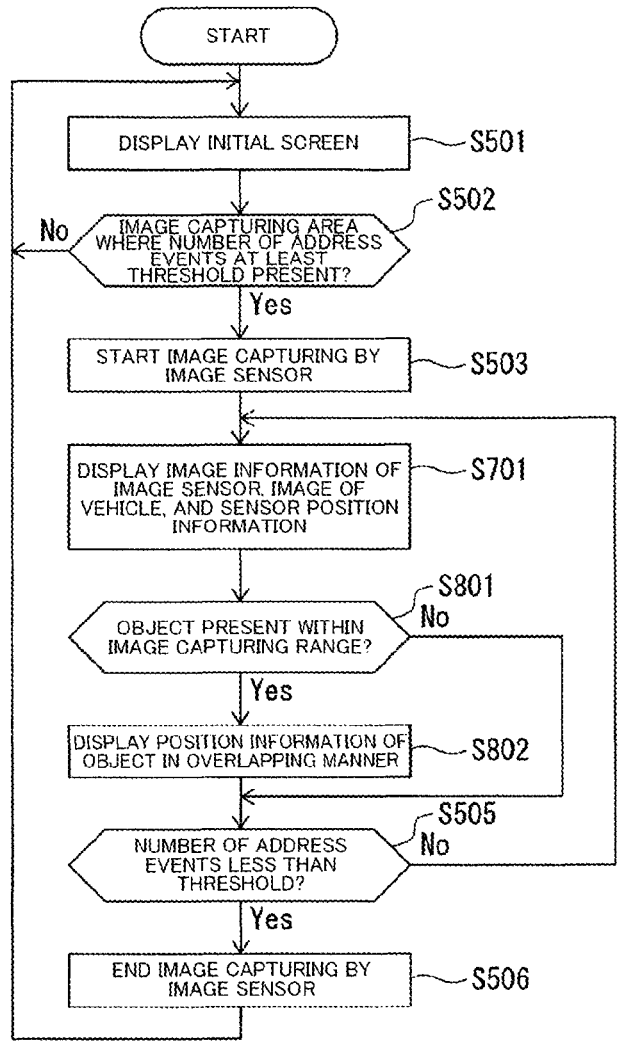
FIG. 19 is a flowchart illustrating sensor control processing according to a variation.

(2) Additionally, as illustrated in FIG. 18, the vehicular image capturing system 1 may further include a data processing unit 25 that executes object recognition on the basis of at least one of the event signal and the image information. Additionally, for example, as illustrated in FIG. 19, steps S801 and S802 may be provided between steps S701 and S505, in addition to step S701, in FIG. 16.

In step S801, the data processing unit 25 determines whether or not there is some kind of object in the image capturing range A, B, C, or D corresponding to the group of pixels 15 for which it has been determined in step S502 that the number of address events is at least the predetermined threshold. Specifically, the object recognition is executed on the basis of at least one of the event signal output from the event detection unit 2 and the image information output from the image sensor 3a, 3b, or 3d which is capturing an image. Then, if it is determined that an object is present in the image capturing range A, B, C, or D (Yes), the sequence moves to step S802. On the other hand, if it is determined that there is no object (No), the sequence moves to step S505.

Figure 20:
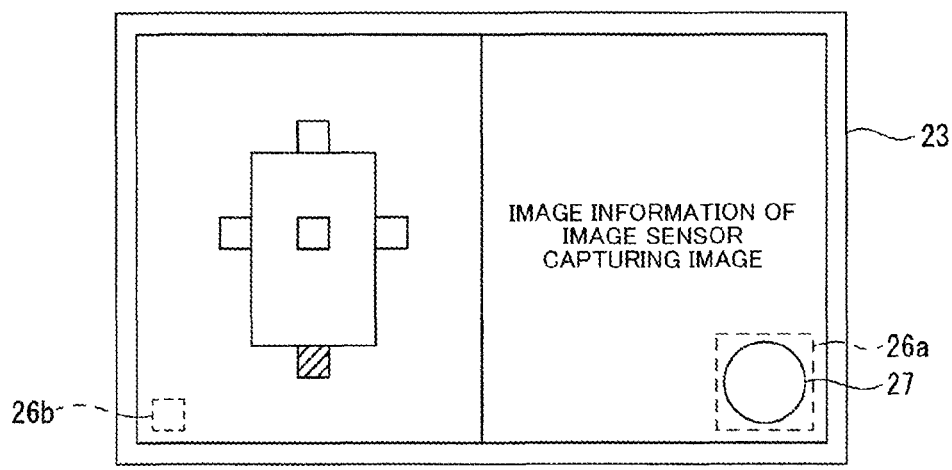
FIG. 20 is a diagram illustrating display content displayed in a display unit according to a variation.

As illustrated in FIG. 20, in step S802, the display control unit 24 further causes position information of the object recognized in step S801 to be displayed in the display unit 23, in the image displayed in the display unit 23 in step S701. For example, a method in which markers 26a and 26b having a predetermined shape are displayed over the position of the recognized object in the image information output by the image sensor 3a, 3b, 3c, or 3d and the image of the vehicle 6 can be employed as a method for providing the position information of the object. FIG. 20 illustrates an example in which a spherical object 27 which has been recognized is surrounded by the markers 26a and 26b, which are square-shaped.

Through this, in the vehicular image capturing system 1 according to the variation, a part in which an object 27 that requires attention, such as a bicycle or the like approaching the vehicle 6, can be understood more easily by the user.

Note that, for example, instead of object recognition, a motion vector may be detected on the basis of at least one of the event signal output from the event detection unit 2 and the image information output from the image sensor 3a, 3b, or 3d which is capturing an image. Then, information according to the detected motion vector may further be displayed in the display unit 23, in the image displayed in the display unit 23 in step S701. For example, if it is determined from the motion vector that an object is approaching the vehicle 6, an alert such as a message indicating that an object is approaching is displayed in the display unit 23.

Figure 21:
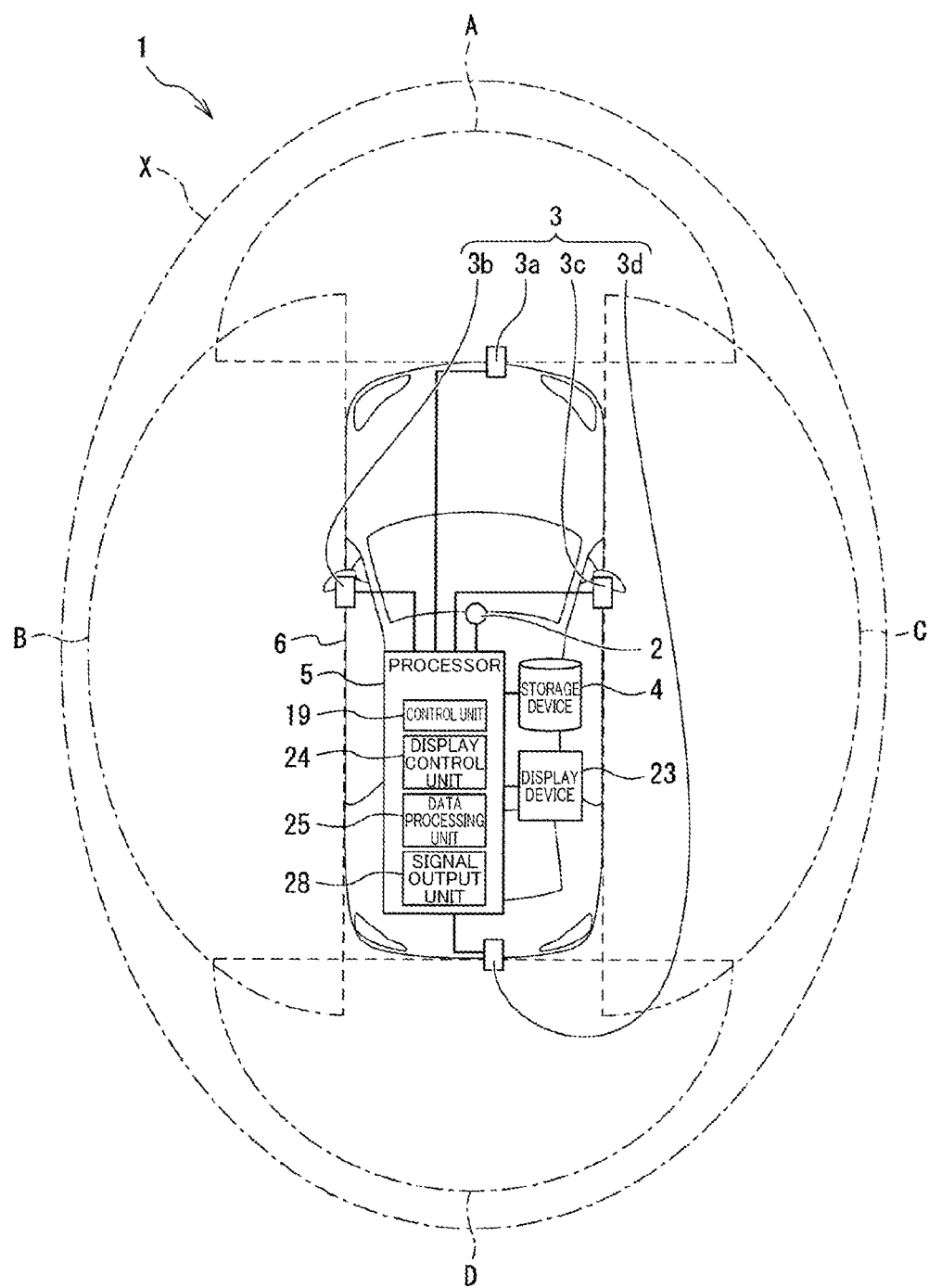
FIG. 21 is a diagram illustrating the configuration of a vehicular image capturing system according to a variation.
Figure 22:
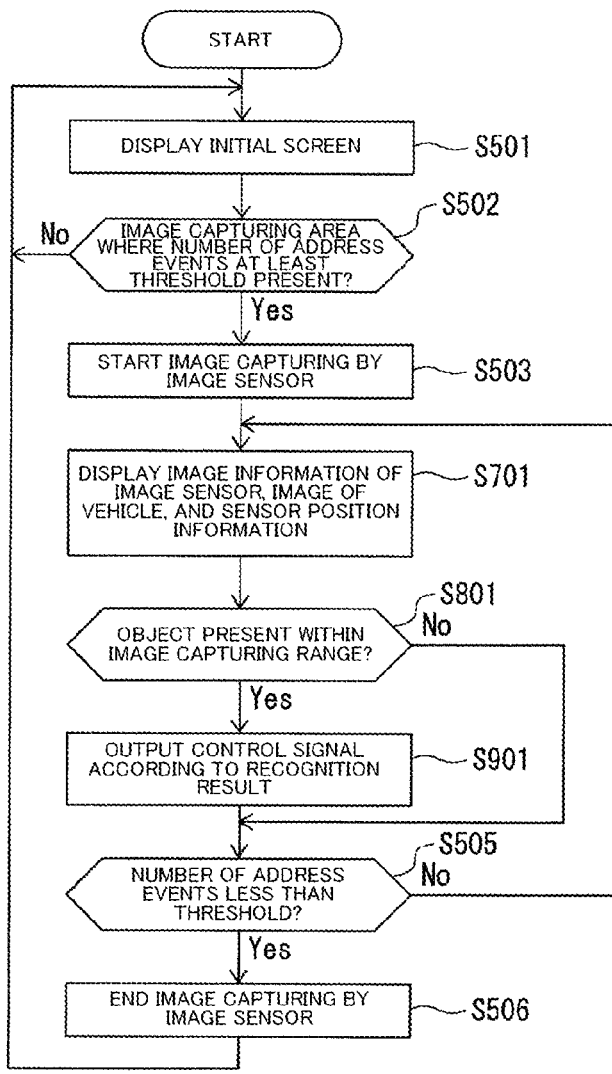
FIG. 22 is a flowchart illustrating sensor control processing according to a variation.

(3) In addition to the data processing unit 25 of FIG. 18, the vehicular image capturing system 1 may further include a signal output unit 28 that outputs control signals to the image sensors 3a, 3b, 3c, and 3d in accordance with a result of the object recognition performed by the data processing unit 25, as illustrated in FIG. 21. Additionally, as illustrated in FIG. 22, step S802 of FIG. 19 may be replaced with step S901.

In step S901, in accordance with a result of the object recognition performed in step S801, the signal output unit 28 outputs a control signal to the image sensor 3a, 3b, 3c, or 3d to which a control signal was output in step S503. For example, at least one of a signal for changing the zoom amount of the electronic zoom, a signal for changing the resolution, a signal for changing the sensitivity, and a signal for changing the framerate, so that the object recognized in the object recognition can be captured clearly, can be employed as the control signal.

Through this, in the vehicular image capturing system 1 according to this variation, when, for example, a bicycle or the like is approaching the vehicle 6, the image information of the approaching bicycle or the like can be displayed clearly.

Note that, for example, instead of object recognition, a motion vector obtained from the event signal or the image information may be used, and the control signal may be output in accordance with a result of the motion vector. For example, at least one of a signal for changing the zoom amount of the electronic zoom, a signal for changing the resolution, a signal for changing the sensitivity, and a signal for changing the framerate, so that the object detected from the motion vector as approaching can be captured clearly, can be employed as the control signal.

4. Fourth Embodiment: Vehicular Image Capturing System

[4-1 Configurations of Primary Elements]

Figure 23:
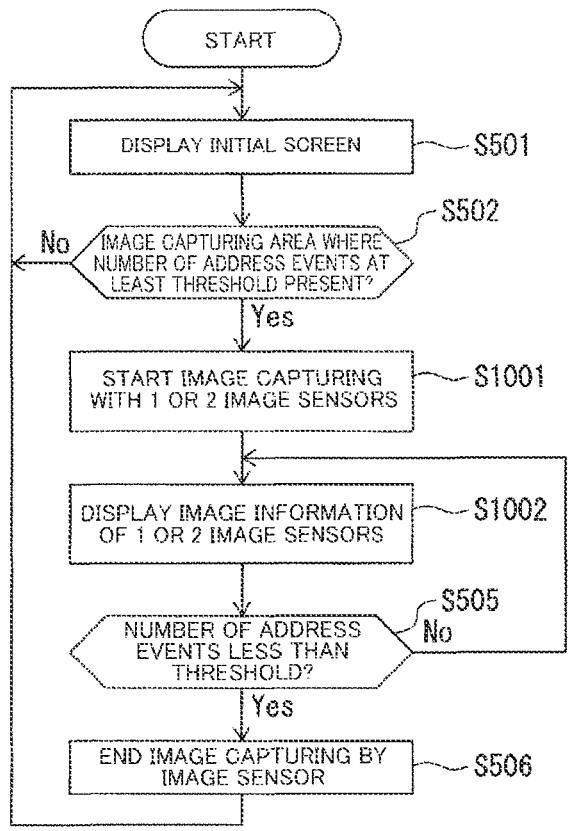
FIG. 23 is a flowchart illustrating sensor control processing according to a fourth embodiment.

Operations of the vehicular image capturing system 1 according to a fourth embodiment of the present disclosure will be described next. The overall configuration of the vehicular image capturing system 1 of the fourth embodiment is the same as the overall configuration of the vehicular image capturing system 1 of the second embodiment, illustrated in FIG. 11. FIG. 23 is a flowchart illustrating sensor control processing by the vehicular image capturing system 1 according to the fourth embodiment. Parts corresponding to the flowchart illustrated in FIG. 12 are included in this flowchart. In FIG. 23, parts corresponding to those in FIG. 12 are given the same reference signs, and redundant descriptions thereof will not be given.

As illustrated in FIG. 23, the sensor control processing of the vehicular image capturing system 1 of the fourth embodiment is provided with steps S1001 and S1002 instead of steps S503 and S504 in FIG. 12.

In step S1001, the control unit 19 detects the image capturing range A, B, C, or D corresponding to the group of pixels 15 for which the number of address events has been determined to be at least the predetermined threshold in step S502, and outputs a control signal to the image sensor 3a, 3b, 3c, or 3d corresponding to the image capturing range A, B, C, or D. A signal that causes the image sensor 3a, 3b, 3c, or 3d to start capturing an image is output as the control signal. Note that if two of the image capturing ranges A, B, C, and D are detected, control signals are output to the image sensors 3a, 3b, 3c, and 3d corresponding to the respective two image capturing ranges A, B, C, and D. Then, one or two of the image sensors 3a, 3b, 3c, and 3d enter an operational state and starts capturing an image, while the rest remain in the non-operational state.

Figure 24:
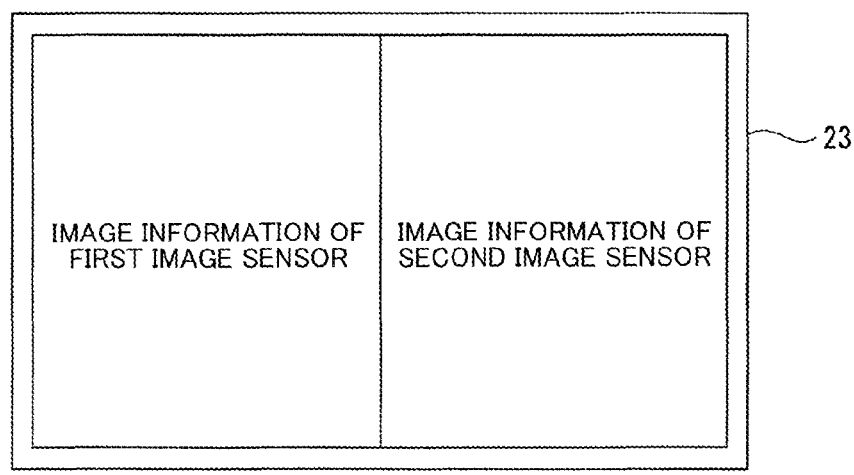
FIG. 24 is a diagram illustrating display content displayed in a display unit.

The sequence then moves to step S1002, where the display control unit 24 causes the image information output by the image sensor 3a, 3b, 3c, or 3d which was made to start capturing an image in step S1001 to be displayed in the display unit 23. Note that when there are two image sensors 3a, 3b, 3c, and 3d which have started capturing an image, the image information output by the two image sensors 3a, 3b, 3c, and 3d is displayed in the display unit 23, as illustrated in FIG. 24. FIG. 24 illustrates an example in which the image information from one of the two image sensors 3a, 3b, 3c, and 3d (also called a "first image sensor" hereinafter) is displayed in the left side of the display screen in the display unit 23, and the image information from the other of the two image sensors 3a, 3b, 3c, and 3d (also called a "second image sensor" hereinafter) is displayed in the right side of the display screen in the display unit 23.

As described thus far, in the vehicular image capturing system 1 according to the fourth embodiment, when the area in the periphery of the vehicle 6 corresponding to the pixels 15 in the event detection unit 2 in which address event has occurred includes two of the image capturing ranges A, B, C, and D, the image information of the image sensors 3a, 3b, 3c, and 3d corresponding to the two image capturing ranges A, B, C, and D is displayed in the display unit 23. As such, a person or the like approaching the vehicle 6 can be presented to the user more appropriately.

[4-2 Variations]

Figure 25:
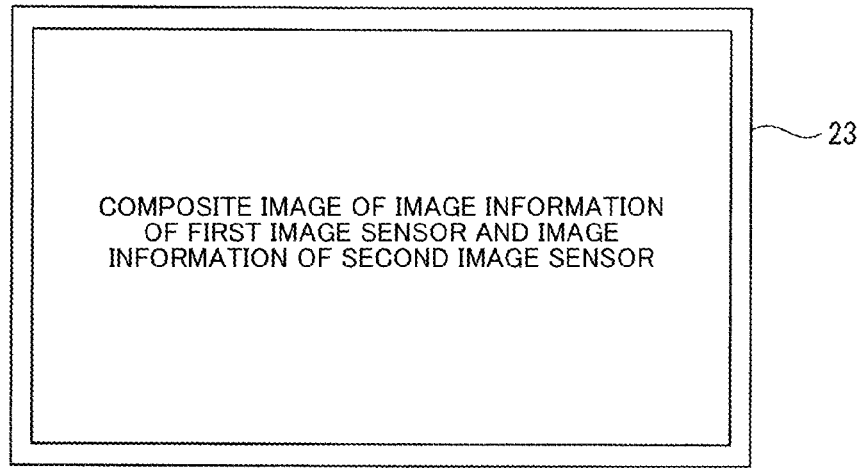
FIG. 25 is a diagram illustrating display content displayed in a display unit according to a variation.

(1) An example in which the display control unit 24 causes two instances of the image information output by the two image sensors 3a, 3b, 3c, and 3d to be displayed in the display unit 23 has been described as the vehicular image capturing system 1 according to the fourth embodiment of the present disclosure, but other configurations can be employed instead. For example, as illustrated in FIG. 25, the configuration may be such that a composite image is generated from the image information output from the two image sensors 3a, 3b, 3c, and 3d, and the generated composite image is displayed in the display unit 23. In other words, the configuration is such that a composite image constituted by a plurality of pieces of image information output from a plurality of the image sensors 3a, 3b, 3c, and 3d including, in their image capturing ranges, the area in the periphery of the vehicle 6 corresponding to the pixels 15 indicated by the event signals, is displayed in the display unit 23. For example, image information obtained by linking and combining the two pieces of image information can be employed as the composite image.

Through this, in the vehicular image capturing system 1 according to this variation, a person or the like approaching the vehicle 6 can be confirmed from a single image, and the person or the like approaching the vehicle 6 can be presented to the user more appropriately.

Figure 26:
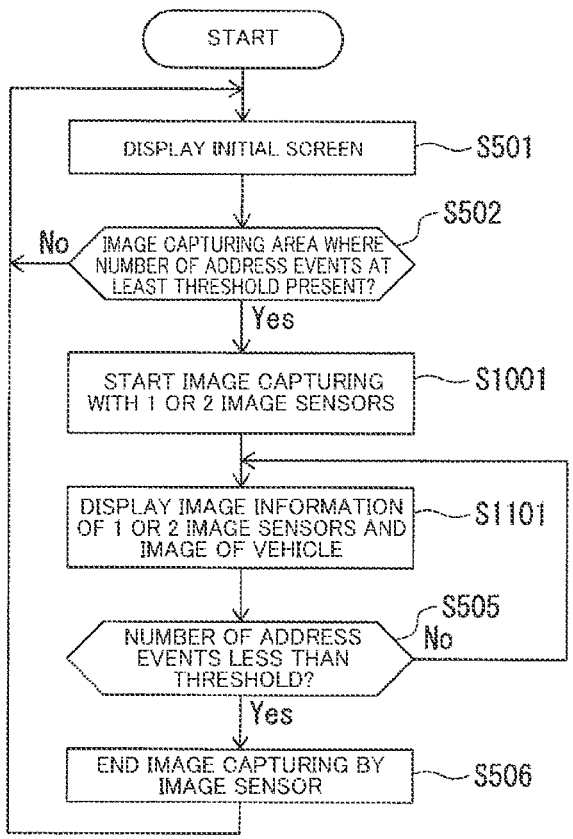
FIG. 26 is a flowchart illustrating sensor control processing according to a variation.

(2) Additionally, as illustrated in FIG. 26, for example, step S1101 may be provided instead of step S1002 in FIG. 23.

Figure 27:
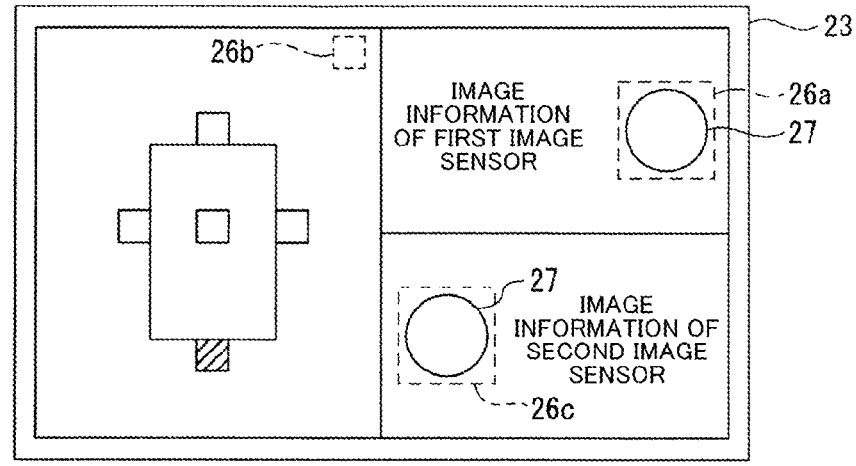
FIG. 27 is a diagram illustrating display content displayed in a display unit according to a variation.

In step S1101, the display control unit 24 causes both the image information output by the image sensor 3a, 3b, 3c, or 3d which was made to start capturing an image in step S1001, and an image of the vehicle 6 from directly above, to be displayed in the display unit 23. Note that when there are two image sensors 3a, 3b, 3c, and 3d which have started capturing an image, the image information output by the two image sensors 3a, 3b, 3c, and 3d is displayed in the display unit 23, as illustrated in FIG. 27. FIG. 27 illustrates an example in which the image information of the first image sensor is displayed in the upper part of the right side of the display screen of the display unit 23, the image information of the second image sensor is displayed in the lower part of the right side of the display screen, and the image of the vehicle 6 from directly above is displayed in the left side of the display screen. FIG. 27 illustrates an example in which the image sensors 3a and 3c are capturing an image, and thus the images of the image sensors 3a and 3c included in the image of the vehicle 6 are displayed in a predetermined color. Furthermore, FIG. 27 illustrates an example in which, when the object 27 is present in the image capturing ranges of the first image sensor and the second image sensor, the object 27 is surrounded by markers 26a, 26b, and 26c.

Accordingly, in the vehicular image capturing system 1 according to this variation, it is easy for the user to know from which direction the image information displayed on the display unit 23 has been obtained.

5. Fifth Embodiment: Vehicular Image Capturing System

[5-1 Configurations of Primary Elements]

Figure 28:
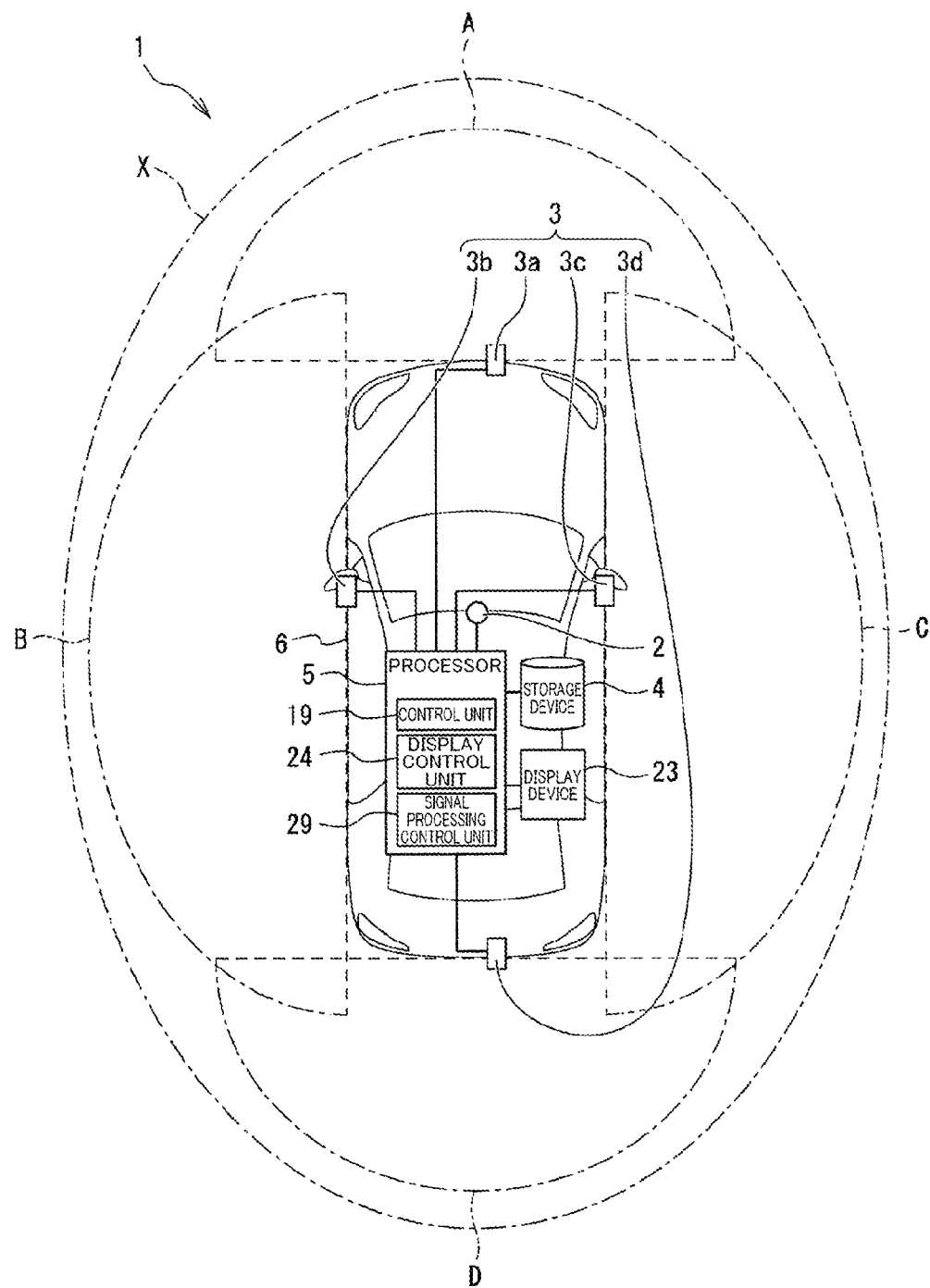
FIG. 28 is a diagram illustrating the configuration of a vehicular image capturing system according to a fifth embodiment.
Figure 29:
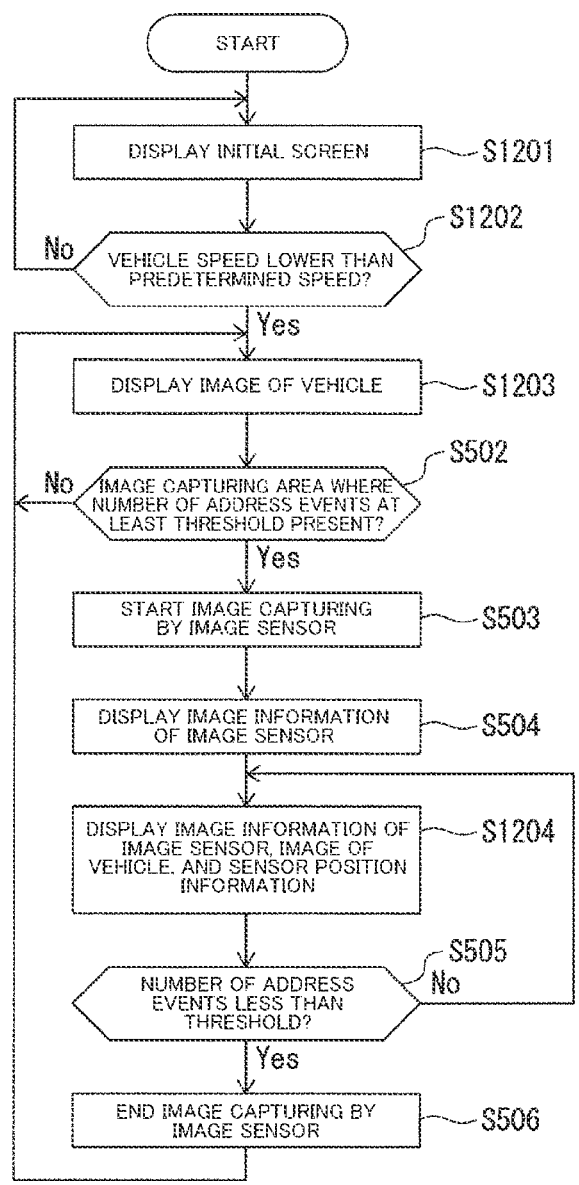
FIG. 29 is a flowchart illustrating sensor control processing.

Operations of the vehicular image capturing system 1 according to a fifth embodiment of the present disclosure will be described next. FIG. 28 illustrates the overall configuration of the vehicular image capturing system 1 according to the fifth embodiment. FIG. 29 is a flowchart illustrating sensor control processing by the vehicular image capturing system 1 according to the fifth embodiment. Parts corresponding to the flowchart illustrated in FIG. 12 are included in this flowchart. In FIGS. 28 and 29, parts corresponding to those in FIGS. 11 and 12 are given the same reference signs, and redundant descriptions thereof will not be given.

As illustrated in FIG. 28, like the vehicular image capturing system 1 of the second embodiment, the vehicular image capturing system 1 of the fifth embodiment includes the event detection unit 2, the image capturing unit 3, the storage device 4, the processor 5, and the display unit 23. In addition to the control unit 19 and the display control unit 24, the processor 5 implements a signal output restriction unit 29. Additionally, in the sensor control processing, steps S1201 and S1202 are provided before step S501 in FIG. 12, and steps S1203 and S1204 are provided instead of steps S501 and S504.

In step S1201, the display control unit 24 causes a predetermined initial screen to be displayed in the display unit 23. If, for example, a car navigation display is used as the display unit 23, a map of the area around the current position of the vehicle 6 is employed as the initial screen.

The sequence then moves to step S1202, where the signal output restriction unit 29 determines whether or not the vehicle speed of the vehicle 6 is lower than a predetermined speed. The predetermined speed is, for example, the speed at which it is possible to determine that the vehicle 6 is just before parking. This is, for example, 5 km/h. If the signal output restriction unit 29 determines that the vehicle speed is lower than the predetermined speed (Yes), the sequence moves to step S1203. On the other hand, if it is determined that the vehicle speed is at least the predetermined speed (No), the sequence returns to step S1201.

Figure 30:
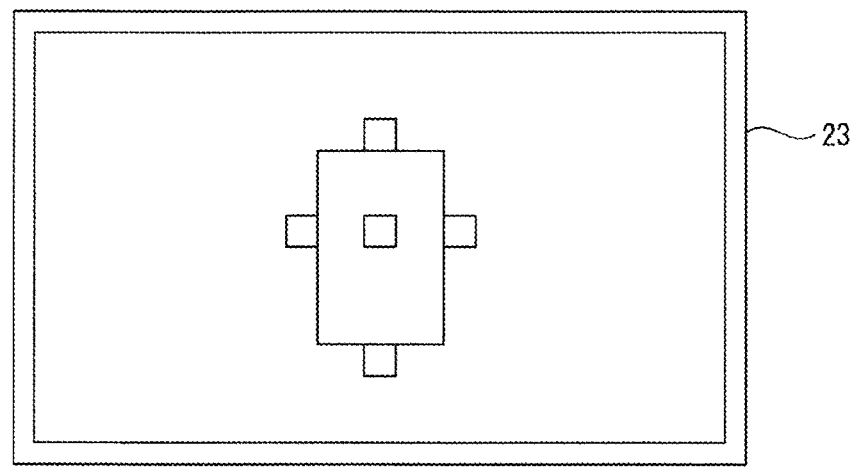
FIG. 30 is a diagram illustrating display content displayed in a display unit.

In step S1203, the display control unit 24 causes an image of the vehicle 6 from directly above to be displayed in the display unit 23, as illustrated in FIG. 30, after which the sequence moves to step S502.

Figure 31:
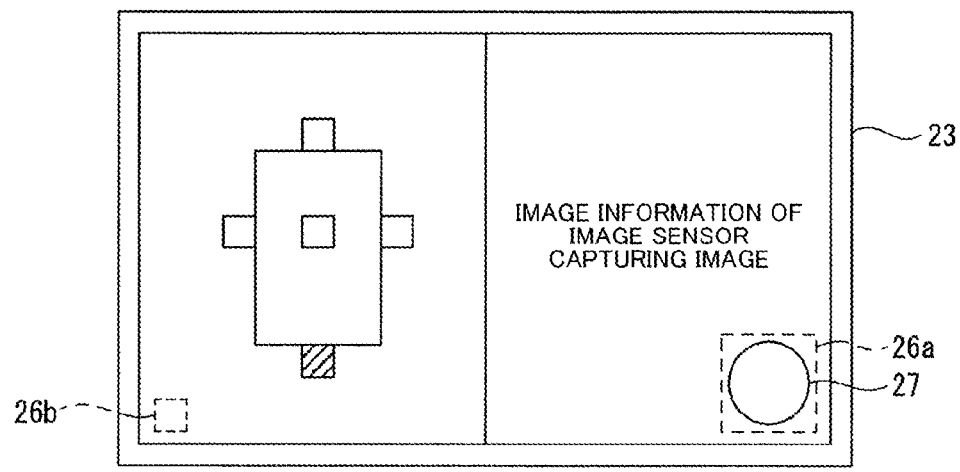
FIG. 31 is a diagram illustrating display content displayed in a display unit.

On the other hand, in step S1204, as illustrated in FIG. 31, the display control unit 24 causes the image information output by the image sensor 3a, 3b, 3c, or 3d which was made to start capturing an image in step S503, the image of the vehicle 6 from directly above, and information indicating the position of the image of the image sensor 3a, 3b, 3c, or 3d that is capturing an image to be displayed in the display unit 23. FIG. 31 illustrates an example in which the image information of the image sensor 3a, 3b, 3c, or 3d is displayed in the upper part of the right side of the display screen of the display unit 23, and the image of the vehicle 6 from directly above is displayed in the left side of the display screen. Additionally, FIG. 31 illustrates an example in which the image sensor 3d is capturing an image, and thus the image of the image sensor 3d included in the image of the vehicle 6 is displayed in a predetermined color. Furthermore, FIG. 31 illustrates an example in which, when the object 27 is present in the image capturing range D of the image sensor 3d, the object 27 is surrounded by the markers 26a and 26b.

As described thus far, in the vehicular image capturing system 1 according to the fifth embodiment of the present disclosure, when the vehicle speed is lower than the predetermined speed (the speed immediately before parking), the image from the image sensor 3a, 3b, 3c, or 3d which is capturing an image is displayed in the display unit 23. As such, for example, image information showing a person approaching the vehicle 6 can be presented to the user when performing a parking operation.

6. Sixth Embodiment: Vehicular Image Capturing System

[6-1 Configurations of Primary Elements]

Figure 32:
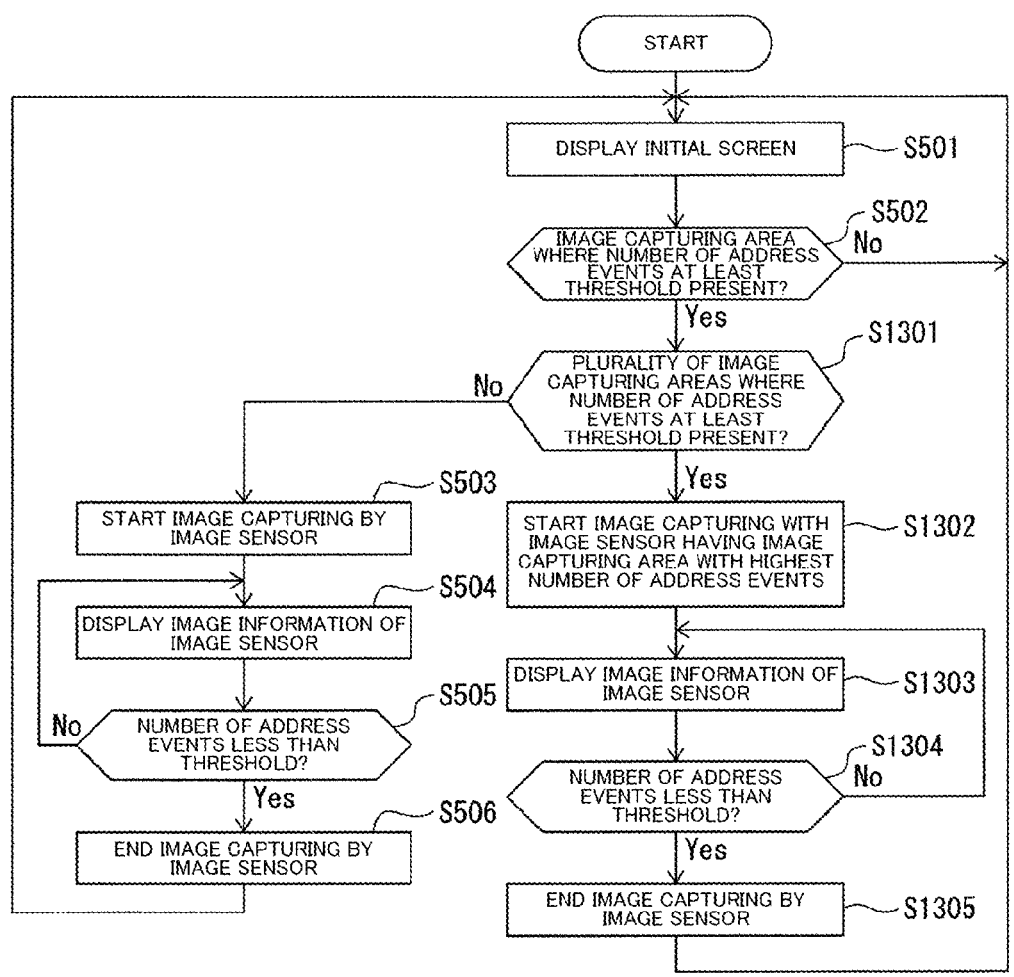
FIG. 32 is a flowchart illustrating sensor control processing according to a sixth embodiment.

Operations of the vehicular image capturing system 1 according to a sixth embodiment of the present disclosure will be described next. The overall configuration of the vehicular image capturing system 1 of the sixth embodiment is the same as the overall configuration of the vehicular image capturing system 1 of the second embodiment, illustrated in FIG. 11. FIG. 32 is a flowchart illustrating sensor control processing by the vehicular image capturing system 1 according to the sixth embodiment. Parts corresponding to the flowchart illustrated in FIG. 12 are included in this flowchart. In FIG. 32, parts corresponding to those in FIG. 12 are given the same reference signs, and redundant descriptions thereof will not be given.

The sensor control processing of the vehicular image capturing system 1 of the sixth embodiment is provided with steps S1301 to S1305 between steps S502 and S503 in FIG. 12.

In step S1301, the control unit 19 detects the image capturing ranges A, B, C, and D corresponding to the group of pixels 15 for which the number of address events has been determined to be at least the predetermined threshold in step S502, and determines whether or not a plurality of the image capturing ranges A, B, C, and D have been detected. In other words, it is determined whether or not there are a plurality of the image sensors 3a, 3b, 3c, and 3d corresponding to the detected image capturing ranges A, B, C, and D. If it is determined that there are a plurality (Yes), the sequence moves to step S1302. On the other hand, if it is determined that there is only one (No), the sequence moves to step S503.

In step S1302, the control unit 19 detects the image capturing ranges A, B, C, and D corresponding to the group of pixels 15 determined to have the highest number of address events, among the group of pixels 15 for which the number of address events has been determined to be at least the predetermined threshold in step S502. A control signal is then output to the image sensors 3a, 3b, 3c, and 3d corresponding to the detected image capturing ranges A, B, C, and D. A signal that causes the image sensor 3a, 3b, 3c, or 3d to start capturing an image is output as the control signal. Accordingly, only one of the image sensors 3a, 3b, 3c, and 3d enters an operational state and starts capturing an image, while the rest remain in the non-operational state. As such, the overall power consumption is kept lower than in a method in which all of the image sensors 3a, 3b, 3c, and 3d are in an operational state.

The sequence then moves to step S1303, where the display control unit 24 causes the image information output by the image sensors 3a, 3b, 3c, and 3d which were made to start capturing an image in step S1302 to be displayed in the display unit 23. Through this, image information showing an approaching person or the like can be presented to the user.

The sequence then moves to step S1304, where the control unit 19 determines whether the number of address events has dropped below the predetermined threshold in the group of pixels 15 in which the number of address events has been determined to be the highest in step S1302 (the specific pixel group). Specifically, it is determined whether or not the number of pixels 15 indicated by the event signal from the event detection unit 2 has dropped below the predetermined threshold in the specific pixel group. If the control unit 19 determines that the number of address events has dropped below the predetermined threshold (Yes), the sequence moves to step S1305. On the other hand, if it is determined that the number of address events is at least the predetermined threshold (No), the sequence returns to step S1303.

In step S1305, the control unit 19 outputs a control signal to the image sensor 3a, 3b, 3c, or 3d that output a control signal in step S1302, after which the sequence returns to step S501. A signal that causes the image sensor 3a, 3b, 3c, or 3d to stop capturing an image is output as the control signal.

As described thus far, in the vehicular image capturing system 1 according to the sixth embodiment of the present disclosure, when the area in the periphery of the vehicle 6 corresponding to the pixels 15 in the event detection unit 2 in which address event have occurred includes two of the image capturing ranges A, B, C, and D, the image information of the image sensors 3a, 3b, 3c, and 3d corresponding to the group of pixels 15 determined to have the highest number of address events in the two image capturing ranges A, B, C, and D is displayed in the display unit 23. As such, more important image information can be displayed in the display unit 23, and more appropriate image information can be presented.

7. Seventh Embodiment: Vehicular Image Capturing System

[7-1 Configurations of Primary Elements]

Figure 33:
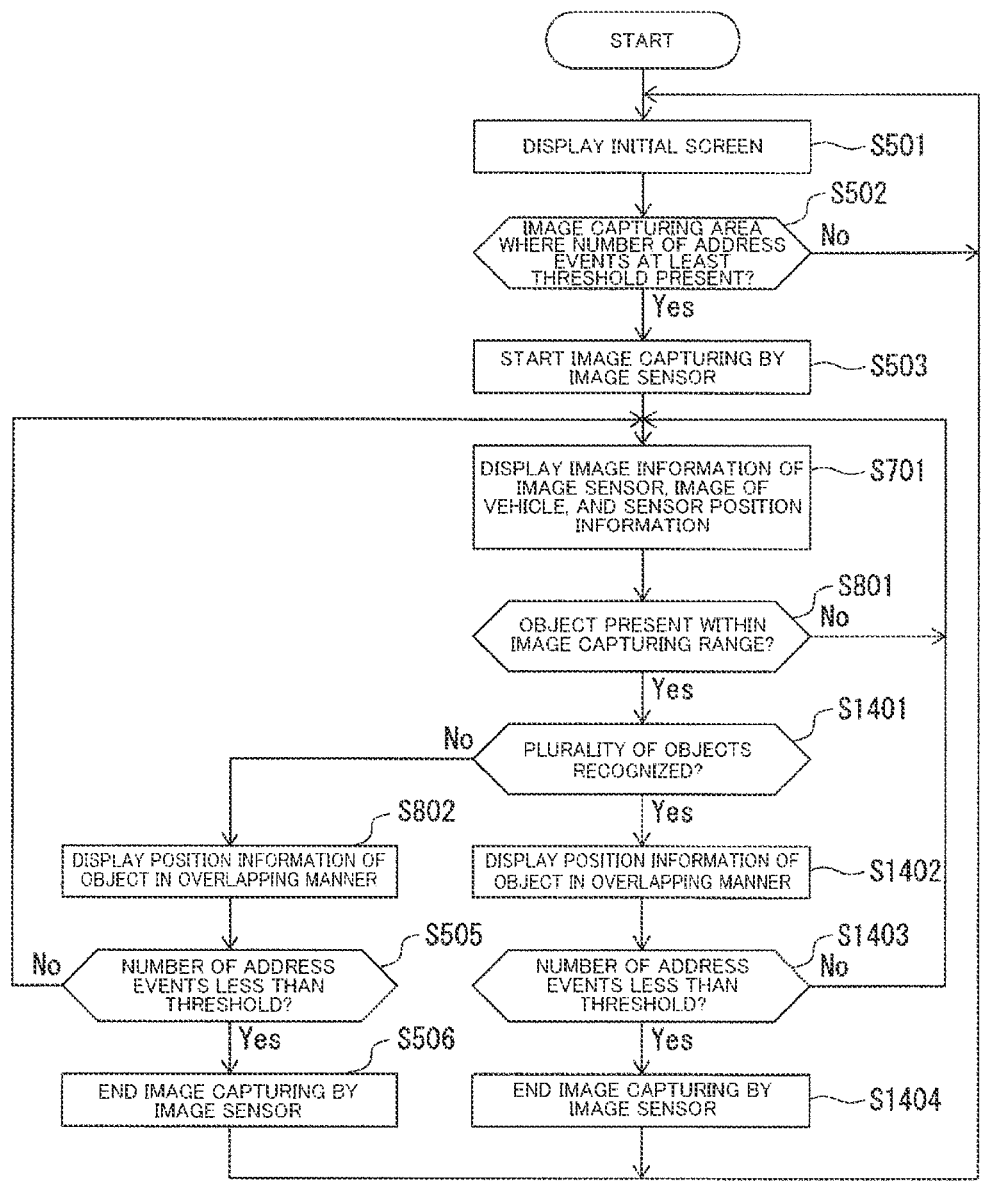
FIG. 33 is a flowchart illustrating sensor control processing according to a seventh embodiment.
Figure 34:
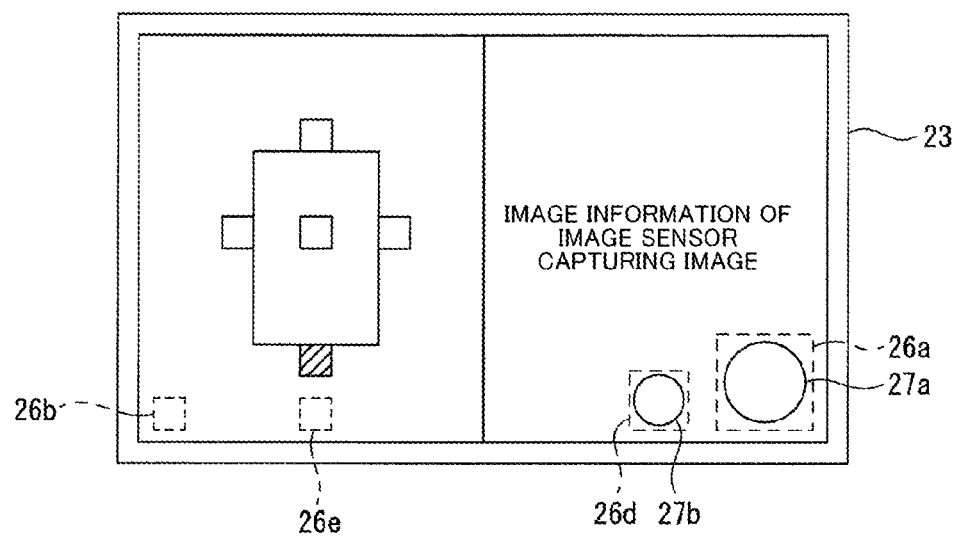
FIG. 34 is a diagram illustrating display content displayed in a display unit.

Operations of the vehicular image capturing system 1 according to a seventh embodiment of the present disclosure will be described next. The overall configuration of the vehicular image capturing system 1 of the seventh embodiment is the same as the overall configuration of the vehicular image capturing system 1 of the second embodiment, illustrated in FIG. 11. FIG. 33 is a flowchart illustrating sensor control processing by the vehicular image capturing system 1 according to the seventh embodiment. Parts corresponding to the flowchart illustrated in FIG. 19 are included in this flowchart. In FIG. 33, parts corresponding to those in FIG. 19 are given the same reference signs, and redundant descriptions thereof will not be given.

The sensor control processing of the vehicular image capturing system 1 of the seventh embodiment is provided with steps S1401 to S1404 between steps S801 and S802 in FIG. 19.

In step S1401, the display control unit 24 determines whether or not a plurality of objects have been recognized in the object recognition of step S801. If it is determined that a plurality of objects have been recognized (Yes), the sequence moves to step S1402. On the other hand, if it is determined that only one object has been recognized or not even one object has been recognized (No), the sequence moves to step S802.

As illustrated in FIG. 28, in step S1402, the display control unit 24 further causes position information of each of the plurality of objects recognized in step S801 to be displayed in the display unit 23, in the image displayed in the display unit 23 in step S701. FIG. 28 illustrates an example in which two spherical objects 27a and 27b are surrounded by markers 26a, 26b, 26d, and 26e, which are square-shaped.

The sequence then moves to step S1403, where the control unit 19 determines whether the number of address events has dropped below the predetermined threshold in the group of pixels 15 in which the number of address events has been determined to be at least the predetermined threshold in step S502. If it is determined that the number of address events has dropped below the predetermined threshold (Yes), the sequence moves to step S1404. On the other hand, if it is determined that the number is at least the predetermined threshold (No), the sequence returns to step S701.

In step S1404, the control unit 19 outputs a control signal to the image sensor 3a, 3b, 3c, or 3d that output a control signal in step S503, after which the sequence returns to step S501. A signal that causes the image sensor 3a, 3b, 3c, or 3d to stop capturing an image is output as the control signal.

As described thus far, in the vehicular image capturing system 1 according to the seventh embodiment of the present disclosure, the position information of each of a plurality of recognized objects is displayed in the display unit 23. As such, it is easier for the user to understand the part of the image showing an object 27 requiring attention.

The present technique can also take on the following configurations.

(1)

A vehicular image capturing system, including:
an event detection unit, installed in a vehicle, that outputs an event signal in accordance with an amount of change in an intensity of received light from a predetermined light receiving range;
an image capturing unit, installed in the vehicle, that performs image capturing, the image capturing being an operation of generating and accumulating a charge in accordance with an intensity of received light from a predetermined image capturing range that at least partially overlaps with the predetermined light receiving range, and generating image information in accordance with an accumulation amount of the charge; and
a control unit that outputs, to the image capturing unit, a control signal according to the event signal.

(2)

The vehicular image capturing system according to (1), wherein the event detection unit outputs the event signal indicating a pixel in which the intensity has changed,
the image capturing unit includes a plurality of image sensors, each having a different image capturing range and each outputting image information of the stated image capturing range, and
the control unit outputs the control signal to the image sensors that include, in the image capturing ranges, an area in a periphery of the vehicle corresponding to a pixel indicated by the event signal.

(3)

The vehicular image capturing system according to (2), wherein the control unit determines whether a group of pixels including at least a predetermined threshold of pixels indicated by the event signal by the event detection unit is present among a group of pixels of the event detection unit corresponding to the respective image capturing ranges of the plurality of image sensors, and outputs the control signal to the image sensor corresponding to the group of pixels determined to be present.

(4)

The vehicular image capturing system according to (3), wherein the control unit outputs a signal for starting the image capturing as the control signal, and when a number of pixels indicated by the event signal has dropped below the predetermined threshold in the group of pixels determined to include at least the predetermined threshold of pixels indicated by the event signal, outputs, as the control signal, a signal causing the image capturing to stop, to the image sensors corresponding to the stated group of pixels.

(5)

The vehicular image capturing system according to any one of (2) to (4),
wherein the event detection unit includes a plurality of event sensors, each having a different light receiving range and outputting the event signal indicating a pixel, in the light receiving range, in which the intensity has changed.

(6)

The vehicular image capturing system according to any one of (2) to (5), further including:
a display unit capable of displaying various types of information; and
a display control unit that causes the display unit to display image information output by the image sensor that includes, in the image capturing range, the area in the periphery of the vehicle corresponding to the pixel indicated by the event signal.

(7)

The vehicular image capturing system according to (6), wherein the display control unit switches the information displayed in the display unit in accordance with the event signal.

(8)

The vehicular image capturing system according to (6) or (7), further including:
a data processing unit that executes object recognition on the basis of at least one of the event signal and the image information,
wherein the display control unit further causes the display unit to display position information of an object recognized through the object recognition.

(9)

The vehicular image capturing system according to any one of (6) to (8),
wherein the display control unit causes the display unit to display a composite image constituted by a plurality of instances of image information output by the plurality of image sensors that include, in the image capturing ranges, the area in the periphery of the vehicle corresponding to the pixel indicated by the event signal.

(10)

The vehicular image capturing system according to any one of (1) to (9), further including:
a data processing unit that executes at least one of object recognition and motion vector detection on the basis of at least one of the event signal and the image information; and
a signal output unit that outputs, to the image capturing unit, the control signal in accordance with at least one of a result of the object recognition and a result of the motion vector detection.

(11)

The vehicular image capturing system according to any one of (1) to (10),
wherein the control signal is at least one of a signal that causes the image capturing unit to start the image capturing, a signal that causes the image capturing unit to stop the image capturing, a signal that causes the image capturing unit to change a zoom amount of electronic zoom, a signal that causes the image capturing unit to change a resolution, and a signal that causes the image capturing unit to change a framerate.

(12)

An image capturing method, including;
obtaining, from an event detection unit that is installed in a vehicle and that outputs an event signal in accordance with an amount of change in an intensity of received light from a predetermined light receiving range, the event signal;
outputting a control signal according to the obtained event signal to an image capturing unit, installed in the vehicle, that generates and accumulates a charge in accordance with an intensity of received light from a predetermined image capturing range that at least partially overlaps with the predetermined light receiving range, and generates image information in accordance with an accumulation amount of the charge; and causing the image capturing unit to perform an operation according to the control signal.

REFERENCE SIGNS LIST

1 Vehicular image capturing system
2 Event detection unit
2a, 2b, 2c, 2d Event sensor
3 Image capturing unit
3a, 3b, 3c, 3d Image sensor
4 Storage device
5 Processor
6 Vehicle
7 Optical lens
8 Incident light
9 Solid-state image sensor
10 Pixel array unit
11 Arbiter
12 Drive circuit
13 ADC column
14 Signal processing unit
15 Pixel
16 Photoelectric conversion element
17 Address event detection unit
18 Signal line
19 Control unit
20 Storage control unit
21 Communication device
22 Communication unit
23 Display unit
24 Display control unit
25 Data processing unit
26a, 26b, 26c, 26d, 26e Marker
27 Object
27a, 27b Object
28 Signal output unit
29 Signal output restriction unit

The invention claimed is:

1. A vehicular image capturing system, comprising:
a display screen;
a set of dynamic vision sensors configured to output an event signal based on an amount of change in an intensity of received light from a light receiving range, wherein
the set of dynamic vision sensors is in a vehicle, and
the event signal indicates a pixel with a change in the intensity of the received light from the light receiving range;
a set of image sensors configured to perform an image capturing operation, wherein
the set of image sensors is in the vehicle,
the set of image sensors includes, in a plurality of image capturing ranges, an area in a periphery of the vehicle corresponding to the pixel indicated by the event signal,
each image sensor of the set of image sensors is associated with a different image capturing range, and
the image capturing operation includes:
generation and accumulation of charge based on an intensity of received light from an image capturing range that at least partially overlaps with the light receiving range, and
generation of image information of the image capturing range based on an accumulation amount of the charge; and
a processor configured to:
output, to the set of image sensors, a control signal based on the event signal; and
control the display screen to display information output by an image sensor that includes, in the image capturing range, the area in the periphery of the vehicle corresponding to the pixel indicated by the event signal, wherein the image sensor is included in the set of image sensors.

2. The vehicular image capturing system according to claim 1, wherein the processor is further configured to:
determine whether a group of pixels including at least a threshold of pixels indicated by the event signal is present among a plurality of pixels corresponding to the plurality of image capturing ranges of the set of image sensors; and output the control signal to an image sensor of the set of image sensors corresponding to the group of pixels determined to be present.

3. The vehicular image capturing system according to claim 2, wherein the processor is further configured to:

output, as the control signal, a signal to start the image capturing operation; and based on a number of pixels indicated by the event signal is below the threshold of pixels in the group of pixels determined to include at least the threshold of pixels indicated by the event signal, output, as the control signal, a signal to cause the image capturing operation to stop, wherein the control signal is outputted to a group of image sensors of the set of image sensors corresponding to the group of pixels determined to include at least the threshold of pixels indicated by the event signal.

4. The vehicular image capturing system according to claim 1, wherein each dynamic vision sensor of the set of dynamic vision sensors is associated with a different light receiving range, and each dynamic vision sensor of the set of dynamic vision sensors is configured to output the event signal indicating the pixel in which the intensity has changed.

5. The vehicular image capturing system according to claim 1, wherein the processor is further configured to switch the information displayed in the display screen based on the event signal.

6. The vehicular image capturing system according to claim 1, wherein the processor is further configured to:

execute an object recognition operation based on at least one of the event signal or the image information; and cause the display screen to display position information of an object recognized through the object recognition operation.

7. The vehicular image capturing system according to claim 1, wherein the processor is further configured to control the display screen to display a composite image constituted by a plurality of instances of the image information output by the set of image sensors that include, in the image capturing ranges, the area in the periphery of the vehicle corresponding to the pixel indicated by the event signal.

8. The vehicular image capturing system according to claim 1, wherein the processor is further configured to:

execute at least one of an object recognition operation or a motion vector detection based on at least one of the event signal or the image information; and output, to the set of image sensors, the control signal based on at least one of a result of the object recognition operation or a result of the motion vector detection.

9. The vehicular image capturing system according to claim 1, wherein the control signal is at least one of a signal that causes the set of image sensors to start the image capturing operation, a signal that causes the set of image sensors to stop the image capturing operation, a signal that causes the set of image sensors to change a zoom amount of electronic zoom, a signal that causes the set of image sensors to change a resolution, a signal that causes the set of image sensors to change a sensitivity, and a signal that causes the set of image sensors to change a framerate.

10. An image capturing method, comprising:

obtaining an event signal from a set of dynamic vision sensors, wherein the set of dynamic vision sensors is in a vehicle, the set of dynamic vision sensors outputs the event signal based on an amount of change in an intensity of received light from a light receiving range, and the event signal indicates a pixel with a change in the intensity of the received light from the light receiving range;

outputting, to a set of image sensors, a control signal based on the obtained event signal, wherein the set of image sensors is in the vehicle, the set of image sensors generates and accumulates charge based on an intensity of received light from an image capturing range that at least partially overlaps with the light receiving range, and generates image information of the image capturing range based on an accumulation amount of the charge, the set of image sensors includes, in a plurality of image capturing ranges, an area in a periphery of the vehicle corresponding to the pixel indicated by the event signal, each image sensor of the set of image sensors is associated with a different image capturing range;

causing the set of image sensors to perform an operation based on the control signal; and controlling a display screen to display information output by an image sensor that includes, in the image capturing range, the area in the periphery of the vehicle corresponding to the pixel indicated by the event signal, wherein the image sensor is included in the set of image sensors.

* * * * *